US010168785B2

(12) United States Patent
Molchanov et al.

(10) Patent No.: US 10,168,785 B2
(45) Date of Patent: Jan. 1, 2019

(54) MULTI-SENSOR BASED USER INTERFACE

(71) Applicant: NVIDIA Corporation, Santa Clara, CA (US)

(72) Inventors: Pavlo Molchanov, Santa Clara, CA (US); Shalini Gupta, San Francisco, CA (US); Kihwan Kim, Sunnyvale, CA (US); Kari Pulli, Palo Alto, CA (US)

(73) Assignee: Nvidia Corporation, Santa Clara, CA (US)

( * ) Notice: Subject to any disclaimer, the term of this patent is extended or adjusted under 35 U.S.C. 154(b) by 61 days.

(21) Appl. No.: 15/060,525

(22) Filed: Mar. 3, 2016

(65) Prior Publication Data
US 2017/0060254 A1    Mar. 2, 2017

Related U.S. Application Data

(60) Provisional application No. 62/127,759, filed on Mar. 3, 2015, provisional application No. 62/127,754, filed on Mar. 3, 2015.

(51) Int. Cl.
| | |
|---|---|
| *G06F 3/01* | (2006.01) |
| *G01S 13/42* | (2006.01) |
| *G01S 7/35* | (2006.01) |
| *G01S 7/41* | (2006.01) |
| *G01S 13/58* | (2006.01) |
| *B60R 11/04* | (2006.01) |
| *G06K 9/00* | (2006.01) |
| *G06K 9/62* | (2006.01) |

(Continued)

(52) U.S. Cl.
CPC .............. *G06F 3/017* (2013.01); *B60R 11/04* (2013.01); *G01S 7/352* (2013.01); *G01S 7/415* (2013.01); *G01S 13/42* (2013.01); *G01S 13/584* (2013.01); *G06F 3/011* (2013.01); *G06K 9/00355* (2013.01); *G06K 9/6256* (2013.01); *G06K 9/6267* (2013.01); *G06K 9/6288* (2013.01); *G06K 9/78* (2013.01); *G06N 3/04* (2013.01); *G06N 3/08* (2013.01)

(58) Field of Classification Search
CPC ......... G06F 2203/014; G06F 2203/015; G06F 3/011; G06F 3/012; G06F 3/013; G06F 3/014; G06F 3/017; G06F 3/0416; B60R 11/04; G06K 9/6288; G06K 9/00355; G06K 9/6256; G06K 9/6267; G06K 9/78; G06N 3/08; G06N 3/04; G01S 13/584; G01S 7/415; G01S 13/42; G01S 7/352
See application file for complete search history.

(56) References Cited

U.S. PATENT DOCUMENTS 6,753,780 B2 *  6/2004  Li ......................... B60N 2/002
                                                             180/271
8,035,624 B2   10/2011  Bell et al.
(Continued)

*Primary Examiner* — Grant Sitta

(57) ABSTRACT

An apparatus and method for gesture detection and recognition. The apparatus includes a processing element, a radar sensor, a depth sensor, and an optical sensor. The radar sensor, the depth sensor, and the optical sensor are coupled to the processing element, and the radar sensor, the depth sensor, and the optical sensor are configured for short range gesture detection and recognition. The processing element is further configured to detect and recognize a hand gesture based on data acquired with the radar sensor, the depth sensor, and the optical sensor.

17 Claims, 20 Drawing Sheets

(51) Int. Cl.
 *G06K 9/78* (2006.01)
 *G06N 3/04* (2006.01)
 *G06N 3/08* (2006.01)

(56) References Cited

U.S. PATENT DOCUMENTS

| | | |
|---|---|---|
| 8,072,470 B2 | 12/2011 | Marks |
| 8,437,506 B2 | 5/2013 | Williams |
| 9,024,814 B2 * | 5/2015 | Bangera ............... G06Q 30/02 340/573.1 |
| 9,227,484 B1 * | 1/2016 | Justice .................. B60N 2/002 |
| 9,403,501 B2 * | 8/2016 | Teng ..................... B60N 2/002 |
| 9,405,120 B2 * | 8/2016 | Graf .................. G02B 27/0149 |
| 9,671,492 B2 * | 6/2017 | Diewald ................. G01S 13/56 |
| 2005/0091610 A1 * | 4/2005 | Frei ...................... G06F 3/0481 715/804 |
| 2007/0096885 A1 | 5/2007 | Cheng et al. |
| 2009/0109083 A1 | 4/2009 | Tietjen |
| 2010/0152600 A1 * | 6/2010 | Droitcour ................ A61B 5/05 600/534 |
| 2010/0266210 A1 | 10/2010 | Markovic et al. |
| 2011/0131005 A1 | 6/2011 | Ueshima et al. |
| 2011/0181509 A1 | 7/2011 | Rautiainen et al. |
| 2011/0181510 A1 | 7/2011 | Hakala et al. |
| 2012/0092284 A1 * | 4/2012 | Rofougaran ............ G06F 3/017 345/173 |
| 2012/0135805 A1 | 5/2012 | Miller, IV |
| 2012/0196660 A1 | 8/2012 | El Dokor et al. |
| 2012/0268308 A1 * | 10/2012 | Tuttle ................... G01S 13/282 342/42 |
| 2012/0280900 A1 * | 11/2012 | Wang .................... G06F 3/0488 345/156 |
| 2013/0027218 A1 * | 1/2013 | Schwarz ................ G01D 4/002 340/870.02 |
| 2013/0314317 A1 * | 11/2013 | Wu ........................ G06F 3/017 345/158 |
| 2013/0328763 A1 * | 12/2013 | Latta ..................... G06F 3/017 345/156 |
| 2014/0071069 A1 * | 3/2014 | Anderson ............... A63F 13/06 345/173 |
| 2014/0198058 A1 * | 7/2014 | Warden ................. G06F 3/0416 345/173 |
| 2014/0198073 A1 * | 7/2014 | Gu ........................ G06F 3/046 345/174 |
| 2014/0223374 A1 * | 8/2014 | Park ...................... G06F 3/017 715/825 |
| 2014/0253287 A1 * | 9/2014 | Bauman ............. G07C 9/00309 340/5.61 |
| 2014/0282224 A1 * | 9/2014 | Pedley ................... G06F 3/017 715/784 |
| 2014/0324888 A1 * | 10/2014 | Xie ........................ G06F 3/017 707/748 |
| 2014/0354450 A1 | 12/2014 | Takahashi et al. |
| 2015/0084884 A1 * | 3/2015 | Cherradi El Fadili ..................... G06F 3/041 345/173 |
| 2015/0138144 A1 * | 5/2015 | Tanabe ................... G06F 3/045 345/174 |
| 2015/0277569 A1 | 10/2015 | Sprenger et al. |
| 2016/0055201 A1 | 2/2016 | Poupyrev et al. |
| 2016/0124512 A1 * | 5/2016 | Maruya .................. G06F 3/017 715/863 |
| 2016/0188967 A1 * | 6/2016 | Chang ................ G06K 9/00362 348/148 |
| 2016/0252607 A1 | 9/2016 | Saboo |
| 2016/0379108 A1 * | 12/2016 | Chung .................... G06N 3/04 706/27 |
| 2016/0379109 A1 * | 12/2016 | Chung .................... G06N 3/04 706/26 |
| 2017/0010653 A1 * | 1/2017 | Chang ................... G06F 1/3262 |

\* cited by examiner

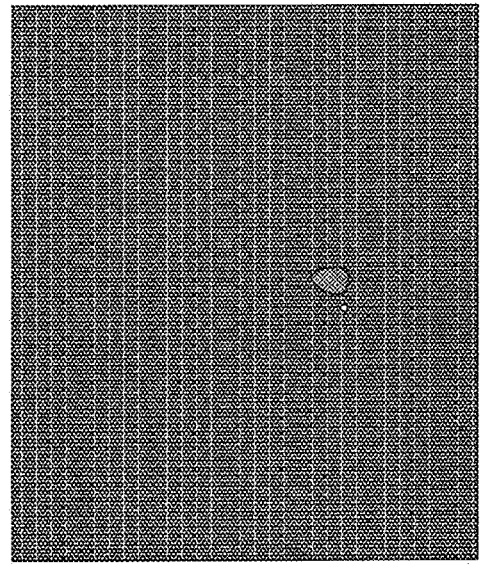
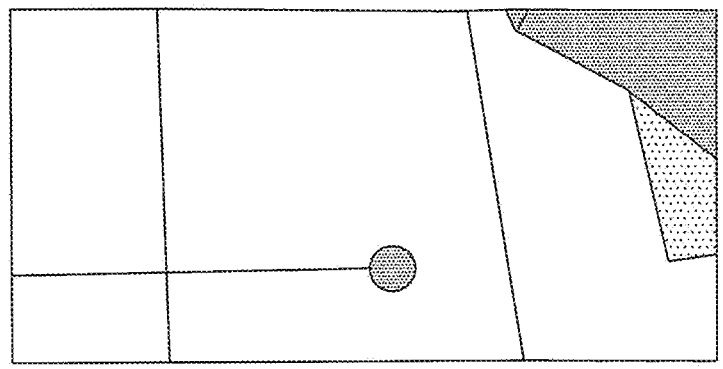
Fig. 7

MULTI-SENSOR BASED USER INTERFACE

RELATED U.S. APPLICATIONS

This application claims the benefit of and priority to the provisional patent application, Ser. No. 62/127,759, entitled "MULTI-SENSOR SYSTEM FOR DRIVER'S HAND GESTURE RECOGNITION," with filing date Mar. 3, 2015, and is hereby incorporated by reference in its entirety.

This application claims the benefit of and priority to the provisional patent application, Ser. No. 62/127,754, entitled "IN-VEHICLE SHORT-RANGE RADAR SYSTEM FOR INTELLIGENT UIs," with filing date Mar. 3, 2015, and is hereby incorporated by reference in its entirety.

This application is related to non-provisional patent application Ser. No. 15/060,545, entitled "RADAR BASED USER INTERFACE," with filing date Mar. 3, 2016, and is hereby incorporated by reference in its entirety.

FIELD

Embodiments of the present invention are generally related to user interfaces and gesture recognition.

BACKGROUND

As computer systems have advanced, computing systems have been used in a variety of new uses. The proliferation of computing systems into new areas of use, such as within vehicles, has resulted in previous user interface designs being not well suited or even insufficient. As a result, user interface designs can be difficult for users to interact with and use, particularly in the automobile environment. For example, a user may be distracted in trying to find the correct on-screen or physical button or knob in order to complete a task. This distraction can be dangerous to the user and others when in a moving vehicle.

SUMMARY OF THE INVENTION

Accordingly, what is needed is a user interface solution to allow interaction and/or control of a computing system in an intuitive and natural way while minimizing distraction.

Embodiments allow for gesture recognition thereby allowing users to interact with computing devices in a natural manner with reduced distraction. Improved accuracy and robustness to a variety of lighting conditions is provided through use of a plurality of sensors. Power consumption can also be reduced through selective operation of the plurality of sensors. Embodiments include a novel multi-sensor system for accurate and power-efficient dynamic (e.g., car-driver) hand-gesture recognition, e.g., using a short-range radar, a color camera, and a depth camera. The combination of the multiple sensors together makes the system robust to variable lighting conditions. In some embodiments, the radar and depth sensors are jointly calibrated. Embodiments can employ convolutional deep neural networks to fuse data from the multiple sensors and to classify the gestures. In an example embodiment, ten different gestures acquired under various illuminating conditions including indoors and outdoors and in a car during the day and at night are recognized. The multi-sensor system consumes significantly less power through selective activation of the sensors than purely vision-based systems. Embodiments can be used in a variety of vehicles including, but not limited to, wagons, bicycles, motor vehicles (e.g., motorcycles, cars, trucks, and buses), railed vehicles (e.g., trains, trams), watercraft (e.g., ships, boats), aircraft and spacecraft.

In one embodiment, the present invention is directed to an apparatus for gesture detection and classification. The apparatus includes a processing element, a radar sensor, a depth sensor, and an optical sensor. The radar sensor, the depth sensor, and the optical sensor are coupled to the processing element, and the radar sensor, the depth sensor, and the optical sensor are configured for short range gesture detection. The processing element is further configured to detect of a hand gesture based on data acquired with the radar sensor, the depth sensor, and the optical sensor.

In some embodiments, the processing element is configured to operate the radar sensor in an always-on mode during a period in which the depth sensor and the optical sensor are powered down. In other embodiments, the processing element is configured to activate the depth sensor and the optical sensor based on motion detection with the radar sensor being above a threshold. In some embodiments, the radar sensor, the depth sensor, and the optical sensor are a portion of a user interface device of a vehicle. In other embodiments, a portion of the processing element is configured to function as a deep neural network (DNN). In some embodiments, the DNN comprises two 3D convolutional layers and two fully-connected layers. In other embodiments, the radar sensor, the depth sensor, and the optical sensor are configured for gesture detection and classification under low light conditions. In some embodiments, the processing element is a graphics processing unit (GPU). In other embodiments, the radar sensor, the depth sensor, and the optical sensor are configured for gesture detection within a range of one meter. In some embodiments, the hand gesture is a dynamic hand gesture and the processing element is configured to automatically determine a command associated with the dynamic hand gesture.

In one embodiment, the present invention is directed toward a system for hand gesture detection and classification. The system includes a processor, a first sensor, a second sensor, and a third sensor. The first sensor, the second sensor, and third sensor are coupled to the processor and the first sensor, the second sensor, and third sensor are configured for short range gesture detection. The processor is further configured to detect of a hand gesture based on data acquired with first sensor, the second sensor, and third sensor. In some embodiments, the first sensor comprises a radar. In some embodiments, the second sensor is a depth sensor. In some embodiments, the third sensor is an optical sensor. In other embodiments, wherein the first sensor, the second sensor, and third sensor are a portion of a user interface for use in a vehicle. In some embodiments, a portion of the processor is configured to function as a deep neural network (DNN). In some embodiments, the processor is a graphics processing unit (GPU).

In another embodiment, the present invention is implemented as a mobile apparatus. The mobile apparatus includes a processing element, a radar sensor, a depth sensor, and an optical sensor. The radar sensor, the depth sensor, and the optical sensor are coupled to the processing element and the radar sensor, the depth sensor, and the optical sensor are configured for short range gesture detection. The processing element is further configured to detect of a hand gesture of a driver based on data received from the radar sensor, the depth sensor, and the optical sensor. The processing element is further configured to automatically determine the type of dynamic hand gesture performed by the user. In some embodiments, the processing element is configured to function as a neural network. In some embodiments, the processing element is a graphics processing unit (GPU).

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 7 shows an example target object used for the calibration and associated data from a multi-sensor system in accordance with various embodiments.

DETAILED DESCRIPTION OF THE INVENTION

Figure 1:
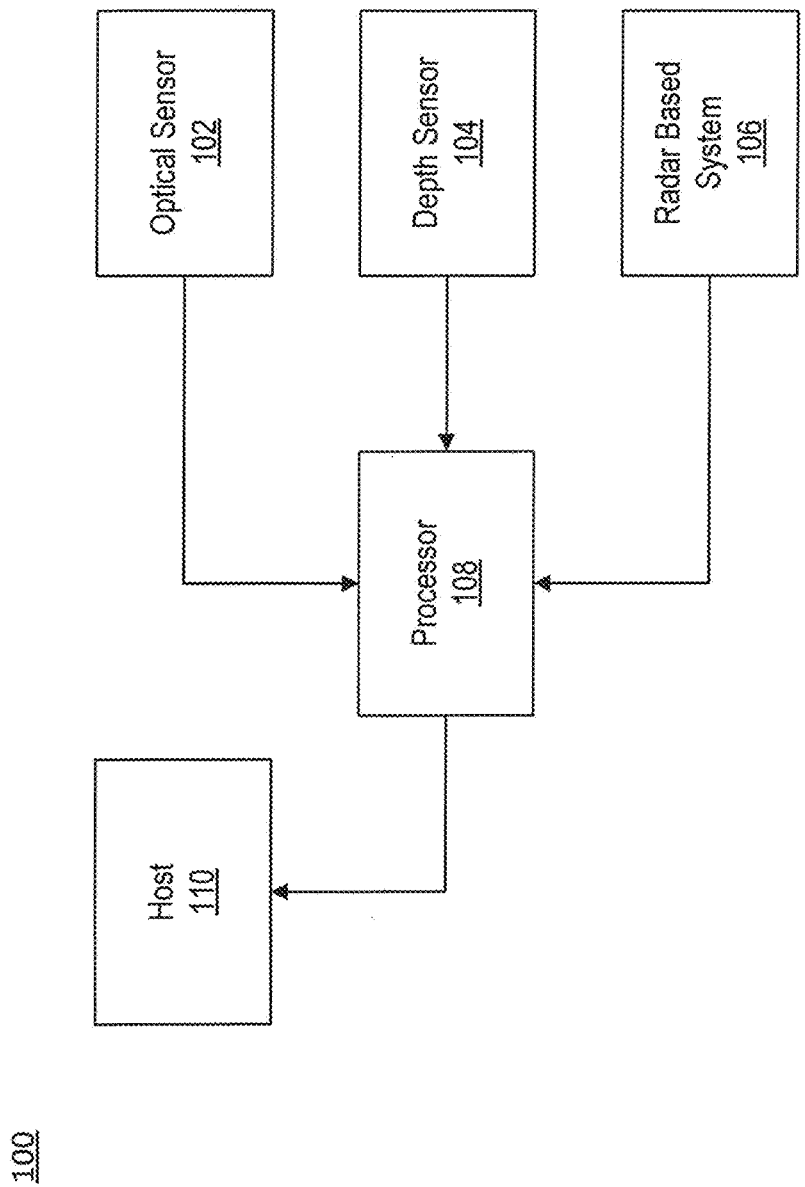
FIG. 1 shows example components of a multi-sensor system for user interaction in accordance with various embodiments.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "performing" or "executing" or "transforming" or "determining" or "calibrating" or "activating" or "detecting" or "deactivating" or "transmitting" or the like, refer to the action and processes of an integrated circuit (e.g., computing system 2000 of FIG. 20), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments include a novel multi-sensor system for accurate and power-efficient dynamic (e.g., car-driver) hand-gesture recognition, e.g., using a short-range radar, a color camera, and a depth camera. The combination of the multiple sensors together makes the system robust to variable lighting conditions. In some embodiments, the radar and depth sensors are jointly calibrated. Embodiments can employ convolutional deep neural networks to fuse data from the multiple sensors and to classify the gestures. In an example embodiment, ten different gestures acquired under various conditions including indoors and outdoors in a car during the day and at night are recognized. The multi-sensor system consumes significantly less power through selective activation of the sensors than purely vision-based systems. Embodiments can be used in a variety of vehicles including, but not limited to, wagons, bicycles, motor vehicles (e.g., motorcycles, cars, trucks, and buses), railed vehicles (e.g., trains, trams), watercraft (e.g., ships, boats), aircraft and spacecraft.

The gestures can be used to control a variety of features including, but not limited to, changing the volume, changing the song playing, changing the radio station, opening a sunroof or moonroof, accepting a call, reading a text message, dismissing a text message, etc.

Embodiments can further monitor health conditions including, but not limited to, respiration and heart rate. For example, heart rate detection could be used to monitor for emergency health conditions, e.g., a heart attack. It is noted that embodiments are well suited for other environments beyond vehicles including, but not limited to, a watch, a tablet, a phone, or any mobile device.

In the United States, driver distraction was involved in 10% of all police-reported crashes in 2013 and resulted in injuries to 424,000 people according to a 2013 National Highway Traffic report. Visual-manual interfaces, such as haptic controls and touch screens in cars, cause significant distraction because of the need for a driver to take his or her eyes off the road. Hand-gesture based user interfaces (UIs) in cars can lower visual and cognitive distraction, and can thereby improve safety and comfort. Gesture based user interfaces do not require drivers to look away from the road. Gesture interfaces can be desirable to consumers. Gesture interfaces can be easily customized to individual users' preferences for gesture types and can further include functionality for driver monitoring.

Numerous video-based dynamic gesture recognition techniques have been developed. With the availability of cheap consumer depth cameras, gesture recognition systems using depth cameras have also been introduced. Most vision-based gesture recognition systems have been developed for environments with controlled illumination. The interior of a car or other vehicle, or the operating environment of a wearable or handheld mobile device, is a challenging environment because the lighting conditions can vary a lot. Most consumer color and depth sensors do not work reliably under these variable conditions. For example, color sensors are ineffective under low-light conditions at night, while depth cameras, which typically use projected infra-red (IR) signals, are ineffective under direct bright sunlight. Further, both depth and color sensors suffer from the presence of harsh shadows and hand self-occlusion. Vehicular interfaces, and wearable and mobile devices also have the added constraint of stricter power efficiency requirements.

Unique micro-Doppler frequency modulation signatures are produced by different types of motion of non-rigid objects. These signatures, as well as the range and the instantaneous angular velocity of the object, can be measured with RAdio Detection And Ranging (RADAR). Compared to color and depth sensors, radars are robust to ambient illumination conditions, have lower cost and computational complexity, and consume less power. The radar signal can also penetrate opaque materials, e.g., plastic and clothing.

Recently convolutional deep neural networks (DNNs) have made a significant impact in computer vision. DNNs have outperformed state-of-the-art machine learning algorithms in very large-scale image recognition and handwritten digits recognition. In a recent competition on multimodal recognition of twenty dynamic gestures from the Italian sign language, an algorithm based on convolutional neural networks ranked first among seventeen competing methods. Convolutional DNNs forgo handcrafting discriminatory features for classification, and instead learn them automatically from training data. DNNs are also attractive for fusing data from multiple sensors because of their ability to automatically weigh their relative importance.

Embodiments include a novel multi-sensor system comprising of a short-range radar, a color camera, and a time-of-flight (TOF) depth camera for dynamic hand-gesture recognition. The system detects dynamic gestures with the help of the short-range (e.g., ≤1 meter) radar system. The system further uses a convolutional DNN to fuse data from the three sensors and to classify different dynamic hand gestures, e.g., ten different dynamic hand gestures. While imaging sensors, or acoustical sensors, have been used individually in the past for dynamic hand gesture recognition, embodiments effectively employ three or more sensors.

There are various advantages to combining image, depth, and radar sensors. First, it can increase the overall system robustness to varying lighting conditions because it guarantees that data from at least one sensor is reliable under any lighting conditions. Second, since the three sensors provide complementary information about the shape, color, and the instantaneous angular velocity of the hand, the information can be combined to improve the classification accuracy of the system. Finally, employing the radar sensor can help to detect and segment dynamic gestures easily and to reduce the power consumption of the system.

Embodiments include a multi-sensor gesture recognition system that effectively combines imaging and radar sensors, uses a radar sensor for dynamic gesture segmentation, accurate recognition, and reduced power consumption, and provides a real-time illumination robust gesture interface for the challenging use case of vehicles.

Video-based hand gesture recognition algorithms, for numerous applications, have been studied with recent work including depth-based algorithms. Most techniques for dynamic hand-gesture recognition involve temporal localization of the gesture, e.g., by means of a binary "motion" and "no motion" classifier. The hand region in gesture frames is often segmented using color and/or depth information by dense or sparse hand-crafted descriptors, and skeletal models are fit to the hand region. To identify the gesture type, sequences of features for dynamic gestures are used to train classifiers, such as Hidden Markov Models (HMM), conditional random fields, Support Vector Machines (SVM), or decision forests. Convolutional DNNs have also been employed previously to detect and recognize twenty gestures from the Italian sign language using RGBD (red, green, blue, and depth) images of hand regions along with upper-body skeletal features, and for classifying six static hand gestures using depth images. Embodiments advantageously are different in their data fusion strategies, features employed, and application scenarios.

Existing approaches for gesture recognition have been developed for controlled lighting conditions where commodity depth and color sensors work well. Gesture recognition becomes challenging in uncontrolled lighting conditions, e.g., in a vehicle, and this problem is much less studied. There exist a few video-based techniques for gesture recognition in cars that use special IR illuminators and a near-IR camera. In these methods, hand-crafted features, including Hu moments, decision rules, or contour shape features along with HMM classifiers have been employed. In a system that uses RGBD data, HOG features and a Support Vector Machine (SVM) classifier was proposed. It is noted that no previous systems for gesture interfaces in cars have employed vision-based and radar sensors together with a DNN classifier.

Independently of vision-based techniques, human motion recognition systems that use micro-Doppler signatures of acoustic signals have also been developed. Acoustical sensors for gesture recognition are not directly applicable inside vehicles because of the presence of significant ambient acoustical noise.

FIG. 1 shows example components of a multi-sensor system for user interaction in accordance with various embodiments. FIG. 1 depicts an example multi-sensor system 100 including an optical sensor 102 (e.g., a color camera), depth sensor 104 (e.g., a time of flight (TOF) depth camera), and a (short range) radar system 106 which in combination are configured for accurate and robust dynamic hand gesture recognition (e.g., in-vehicle). The optical sensor 102, the depth sensor 104, and the radar based system are coupled (e.g., communicatively) to a processor 108. The processor 108 may be any of a variety of processing elements or processors, described herein, including, but not limited to, a graphics processing unit (GPU), a central processing unit (CPU), a field-programmable gate array (FPGA), a custom application-specific integrated circuit (ASIC), or a microcontroller. The processor 108 is coupled to a host 110. The system 100 is configured to operate as an interactive user interface for controlling a host 110 which may be a variety of devices including a vehicle's navigation system, one or more multimedia devices, and controls thereby reducing operator distraction and improving comfort. The host 110 may be controlled with one or more commands that are associated with a gesture determined by the processor 108 and sent to the host 110 by the processor 108.

In some embodiments, the system 100 is located in the center console facing the interior of the vehicle. The system 100 can capture data (e.g., simultaneously) of a moving hand using a color camera, a depth camera, and a short range radar. Due to the radar signal being able to penetrate plastic, the radar system 106 can be housed behind a dashboard of the vehicle. Gestures can be detected anywhere within the field of view (FOV) of the interface. In some embodiments, the color and depth cameras are a part of a DS325 system, available from SoftKinetic of Belgium. The color camera acquires RGB images (640×480)(VGA) and the depth camera captures range images (320×240) of the objects that are closest to it, both at 30 fps. The depth sensor may have a resolution of 320×240 (QVGA), a threshold at 65 cm (e.g., for gestures), and an acceptable noise level of <1.4 cm at 1 meter. The depth sensor 104 can capture the depth (z) values of the objects closest at 30 fps. The radar system 106 can measure the range (z) and angular velocities (v) of moving objects in the scene and estimate their azimuth (x) and elevation (y) angles.

In some embodiments, the system 100 determines that a gesture is occurring based on the radar system 106 detecting motion with velocities above a configurable or predetermined threshold (e.g., 0.05 or 0.06 m/s). The threshold can be based on motion above the threshold that is approximately in the center of the FOV of the system 100. In some embodiments, the radar system 106 is operated in an always-on mode and based on the radar system 106 detecting a hand gesture, the optical sensor 102 and the depth sensor 104 are turned on. In one embodiment, since the radar 106 consumes significantly less power (<1 W) than the optical sensor 102 and depth sensor 104 (<2.5 W), the design of system 100 can significantly lower the overall power requirements of the gesture interface.

Since the radar system directly measures the velocity of moving objects, it can be the only sensor that is used to detect and segment gestures in our system. In some embodiments, the duration of a gesture is assumed to be between 0.3 and 3 seconds. The gesture is determined to have ended when no motion is observed by the radar continuously for 0.5 seconds.

Figure 3:
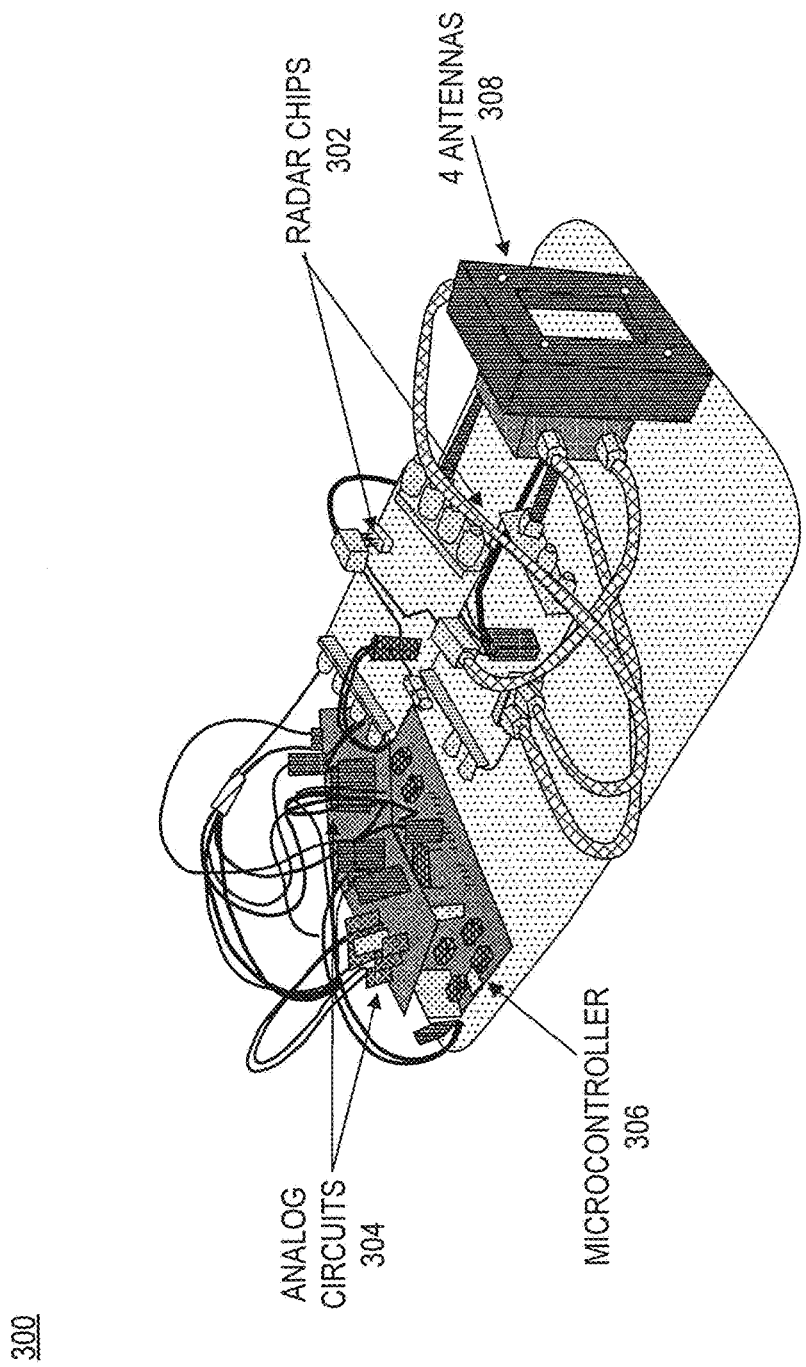
FIG. 3 shows an example image of a radar system in accordance with various embodiments.

In some embodiments, a prototype radar system was built, with an operational range of ≤1 m (e.g., FIG. 3). The prototype radar system measures the range (z) and angular velocity (v) of moving objects in the scene, and estimates their azimuth (x) and elevation (y) angles. It employs a mono-pulse frequency modulated continuous wave (FMCW) signal. The mono-pulse technique allows for the measurement of the angular position of moving objects by employing pairs of vertical (for elevation) and horizontal (for azimuth) colocated receivers. Additionally, the distance of the objects from the radar can be measured by employing the FMCW principle.

In the prototype radar system, a 24 GHz front-end Infineon chip was used with wave guide antennas. This frequency band is available for public use and can be implemented using low-cost (e.g., <$40) components. The system further includes analog circuits designed for filtering and amplifying the received signal. In some embodiments, a Tiva C microcontroller (available from Texas Instruments, Inc. of Dallas, Tex.) for controlling the radar chip, sampling the signal, generating the control signal, and for transferring data to the host. In one embodiment, the prototype radar system consumes <1 W power from the USB port. In one embodiment, the radar system 106 may consume significantly less power (~15 mW).

In some embodiments, the gesture recognition framework may be based on the robotic operating system (ROS). The ROS or another operating system may be used based on having automatic multi-threading, being open source, supporting for multiple languages (e.g., C/C++, Python, Java), supporting multi-rate sensor, and supporting recording and playback for a number of sensors (e.g., simultaneously).

In some embodiments, the system 100 normalizes for the variability in the speed of gestures performed by different subjects by temporally re-sampling gestures to 60 frames (e.g., 2 seconds). The boundary of the hand is located in each frame by segmenting the closest object in depth images and creating a binary mask for the hand region. The mask can then be applied to the radar images while retaining the instantaneous velocities of the hand region only.

In some embodiments, the system 100 includes a deep neural network (DNN) (e.g., executing on the processor 108) which is trained for recognizing different dynamic gestures. Subsampled (e.g., 32×32) versions of the masked depth and velocity images along with the unmasked color images of the 60 frames of a gesture can be used as inputs to a DNN classifier configured to classify the data as a gesture. The DNN can have two 3D (x, y, t) convolution layers configured to automatically extract relevant temporal features for gesture recognition. The determination about the type of the gesture can be made by four fully connected layers, to which, features from the convolution layers are input.

Figure 2:
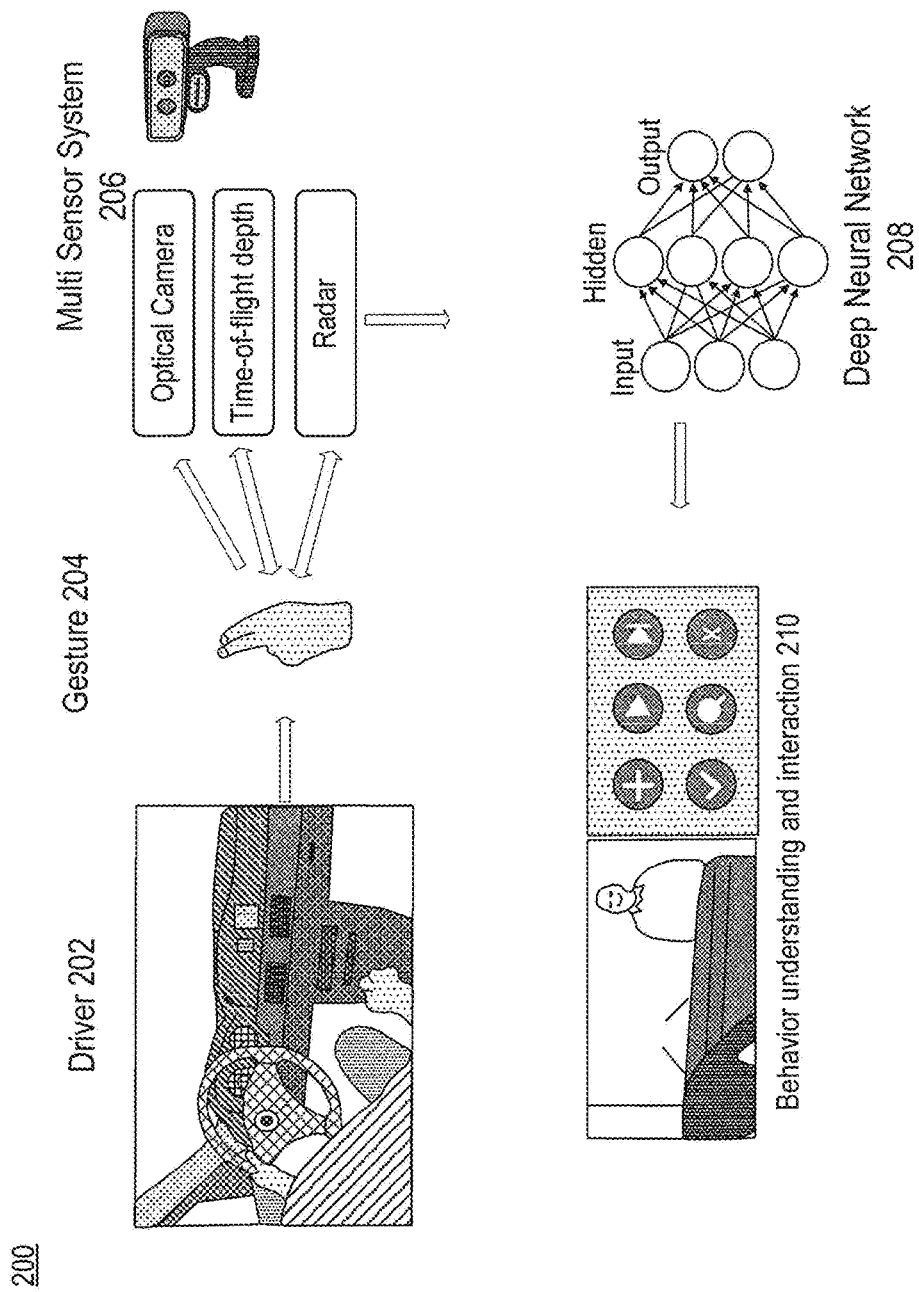
FIG. 2 shows an example gesture processing flow in accordance with various embodiments.

FIG. 2 shows an example gesture processing flow in accordance with various embodiments. FIG. 2 depicts a data flow 200 from a driver 202 making a gesture 204 and the gesture being processed by a multi-sensor gesture recognition system 206. When the driver 202 performs the gesture 204, the gesture 204 is sensed by the sensors of a multi-sensor gesture recognition system 206 (e.g., system 100) that can include optical, depth, and radar sensors. Embodiments may use other sensors including IR sensors, audio sensors (e.g., a microphone), and stereo cameras. In some embodiments, data from the multiple sensors are input into a deep neural network classifier 208 for recognizing dynamic gestures. The recognized gesture can then be processed with behavior understanding and interaction, e.g., sending a command to a system of a vehicle.

In some embodiments, the gesture interface is located in the central console facing the interior of the car within arm's reach (e.g., 50 cm) of the driver. It simultaneously captures data of a moving hand with the color camera, the depth camera, and the radar. In some embodiments, gestures can be performed anywhere roughly within the center of the field of view (FOV) of the interface.

FIG. 3 shows an example image of a radar system in accordance with various embodiments. FIG. 3 depicts an example short-range radar prototype 300 including radar chips 302, analog circuits 304, microcontroller 306, and antennas 308. The radar prototype 300 may have functionality and components as described in the non-provisional patent application Ser. No. 15/060,545, entitled "RADAR BASED USER INTERFACE," with filing date Mar. 3, 2016, and is hereby incorporated by reference in its entirety.

The example radar prototype 300 can use a mono-pulse FMCW radar including one transmitting (Tx) and 3 receiving (Rx) antennas. The array of antennas 308 can be configured to measure spherical coordinates (e.g., distance, azimuth, and elevation) and radial velocities of moving objects. The example radar system 300 can estimate a range (depth) that depends on bandwidth, e.g., 4 cm. The example radar system 300 can estimate a radial velocity (Doppler) at a regular grid with a resolution that depends on observation time (frame rate), e.g., 0.04 m/s. The angle of arriving signals (e.g., azimuth and elevation) can be estimated with the resolution depending on the signal to noise ratio (SNR).

Figure 4:
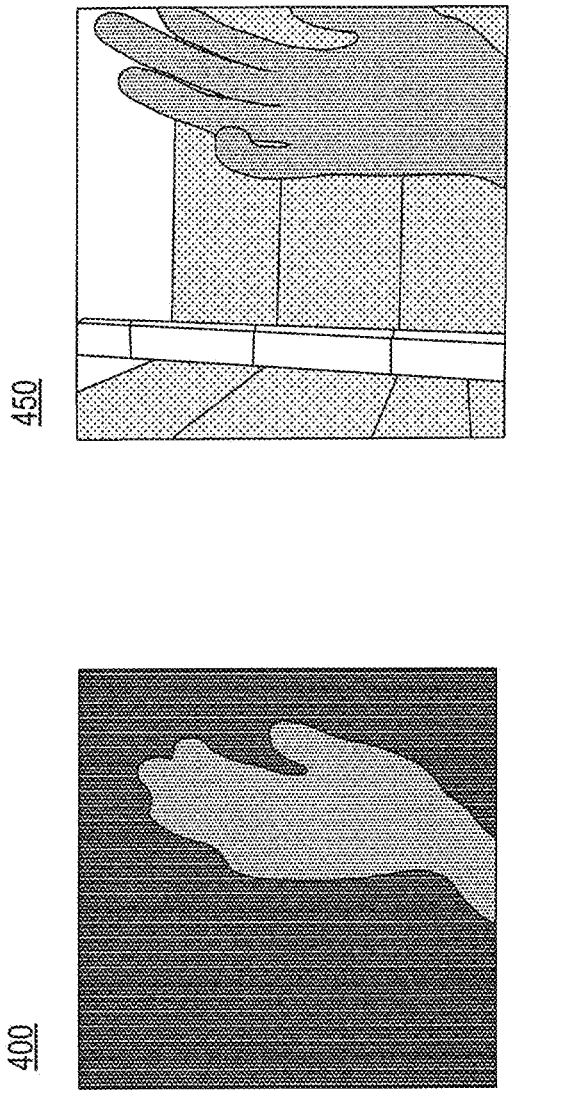
FIG. 4 shows an example depth image from a depth sensor and an example color image from an optical sensor in accordance with various embodiments.

FIG. 4 shows an example depth image from a depth sensor and an example color image from an optical sensor in accordance with various embodiments. FIG. 4 depicts example depth sensor data 400 of a hand and an example color image 450 of a hand.

Figure 5:
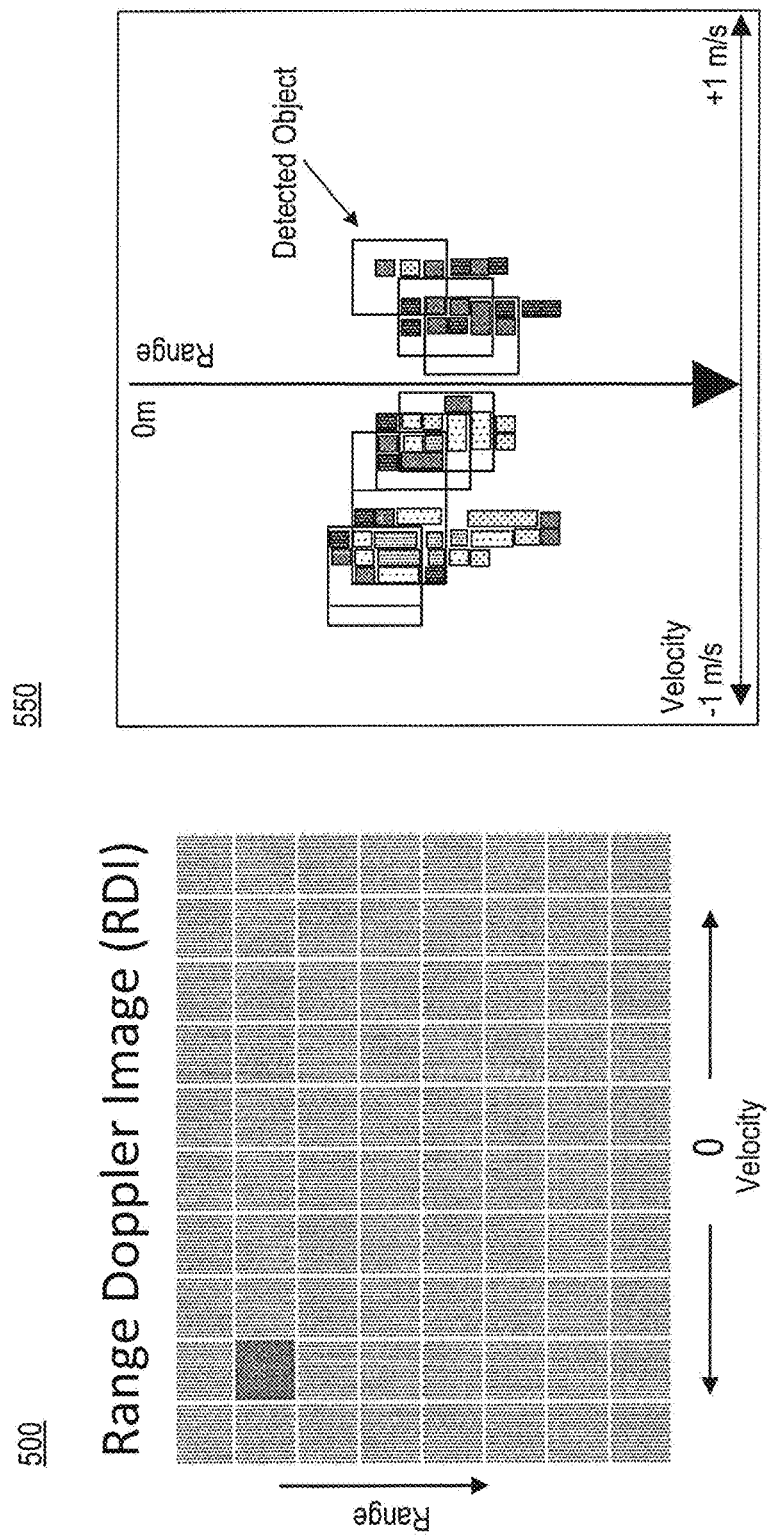
FIG. 5 shows an example range-Doppler image in accordance with various embodiments.

FIG. 5 shows an example range-Doppler image (RDI) in accordance with various embodiments. FIG. 5 depicts an example RDI 500 with range on one axis and velocity on the other axis and an example RDI 550 with data associated with a detected object (e.g., a hand).

Figure 6:
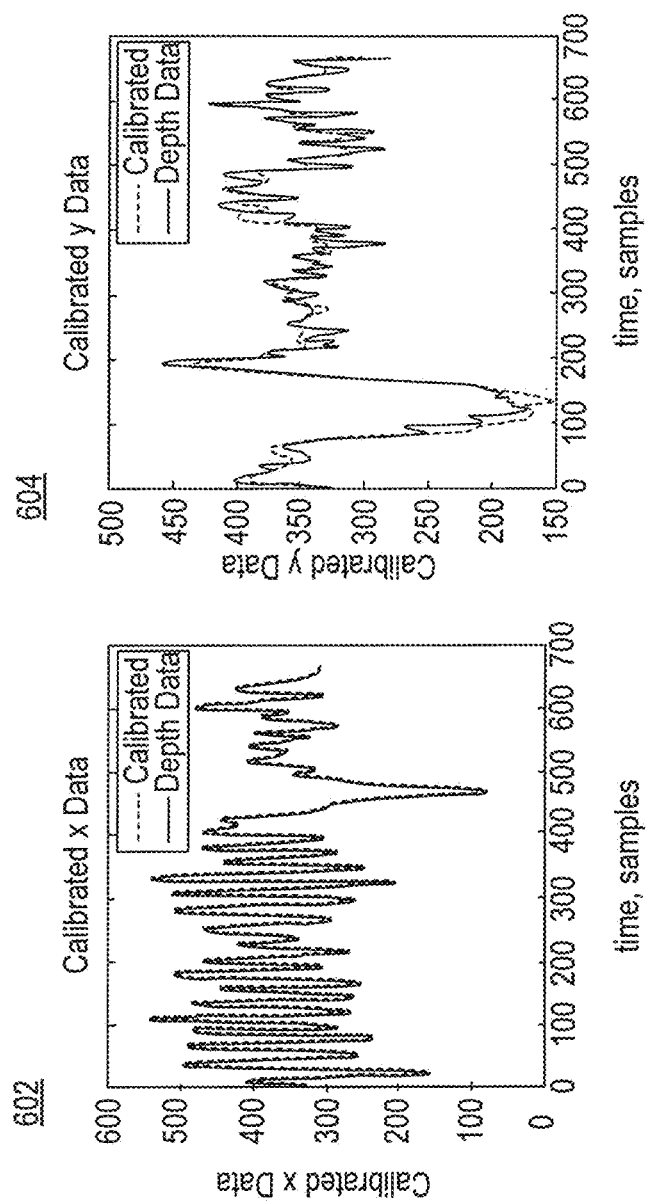
FIG. 6 shows example calibration data for depth and radar sensors in accordance with various embodiments.

FIG. 6 shows example calibration data for depth and radar sensors in accordance with various embodiments. FIG. 6 depicts graphs 602 and 604 of data for joint calibration of radar and depth sensors. The plot shows the x and y coordinates of the center of the calibration target measured by the radar and depth sensors after calibration.

Embodiments include a procedure to jointly calibrate the depth and the radar sensors. This calibration procedure facilitates the registration of data from multiple sensors, each of which are in their own coordinate system, to a reference frame. The calibration may be performed only once after the multi-sensor system is installed rigidly (e.g., into fixed locations within a module or a vehicle).

The calibration can be based on a linear transformation (e.g., rotation and translation) existing between the (optical) imaging centers of the radar and depth sensors. In order to estimate this transformation, the 3D coordinates of the center of a moving spherical ball of radius (e.g., 3 cm) are concurrently observed with both sensors. The best-fit (e.g., minimum mean square error) transformation function between the 3D coordinates of the ball observed by the two sensors can be estimated using the linear least-squares optimization. With the help of the transformation function, the radar data is transformed to the depth camera's coordinate frame. This procedure successfully registers the depth and radar data.

In some embodiments, the depth and radar calibration may be based on the characteristic that the radar senses moving objects and based on an assumption of rotation and translation estimated as a single 3×4 matrix. A least squares method may be used for estimates. The calibration may be done with a metallic pendulum (e.g., 3 cm in diameter) as shown in FIG. 7.

In some embodiments, calibration information for color and depth sensors can be accessed from device firmware (e.g., of a SoftKinetic device). Using the calibration information for the color and depth sensors with the radar and depth sensor calibration information, for each depth frame, a registered RGB image and an image comprising the instantaneous velocity at each pixel (e.g., from the radar) can be sampled.

FIG. 7 shows an example calibration object and associated data from a multi-sensor system in accordance with various embodiments. FIG. 7 depicts an optical sensor image 700 of a metallic sphere and a depth sensor image 750 of the metallic sphere.

Figure 8:
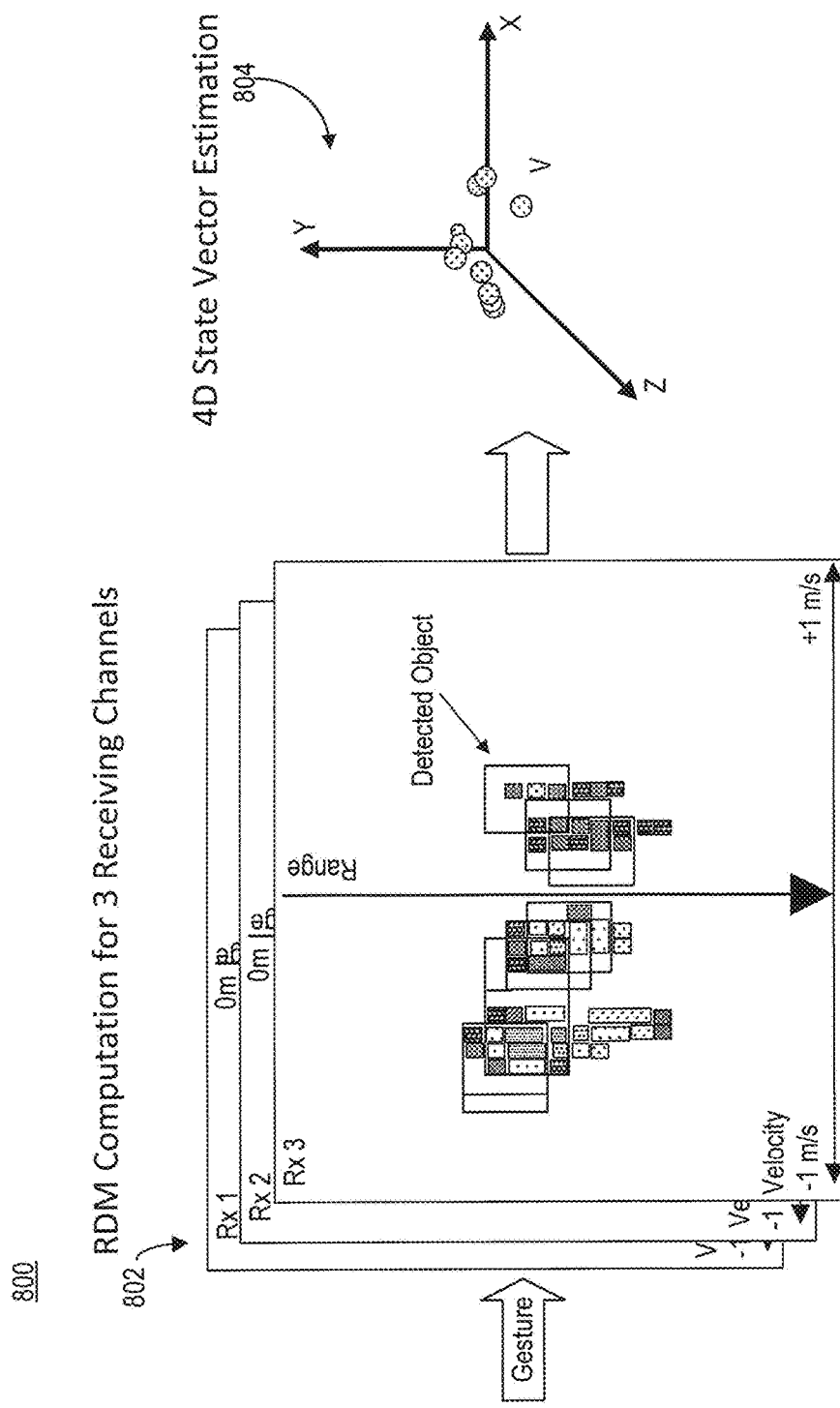
FIG. 8 shows an example processing data flow of radar data in accordance with various embodiments.

FIG. 8 shows an example processing data flow of radar data in accordance with various embodiments. FIG. 8 depicts an example radar signal processing pipeline. A range-Doppler map (RDM) or range-Doppler image (RDI), which depicts the amplitude distribution of the received signals for certain range (z) and Doppler (v) values, is generated for each of the three receivers. A dynamic gesture generates multiple reflections, which are detected and stored as range-Doppler maps 802 of each of three receivers. A rigid moving object can appear as a single point in the RDM and a non-rigid object, e.g., a hand, can appear as multiple points. The radar system (e.g., radar system 106) can disambiguate moving objects that are spatially separated in the RDM. In some embodiments, moving objects are detected in the RDM by applying a Cell-Average Constant False Alarm Rate (CACFAR) threshold-based detector. The phase of each detected moving object at the three receivers is compared to estimate its azimuth and elevation angles. By comparing the phases of the signals received by pairs of receivers, 4D vectors 804 comprising the spatial coordinates and the radial velocity is estimated for each point detected in the RDM.

Figure 9:
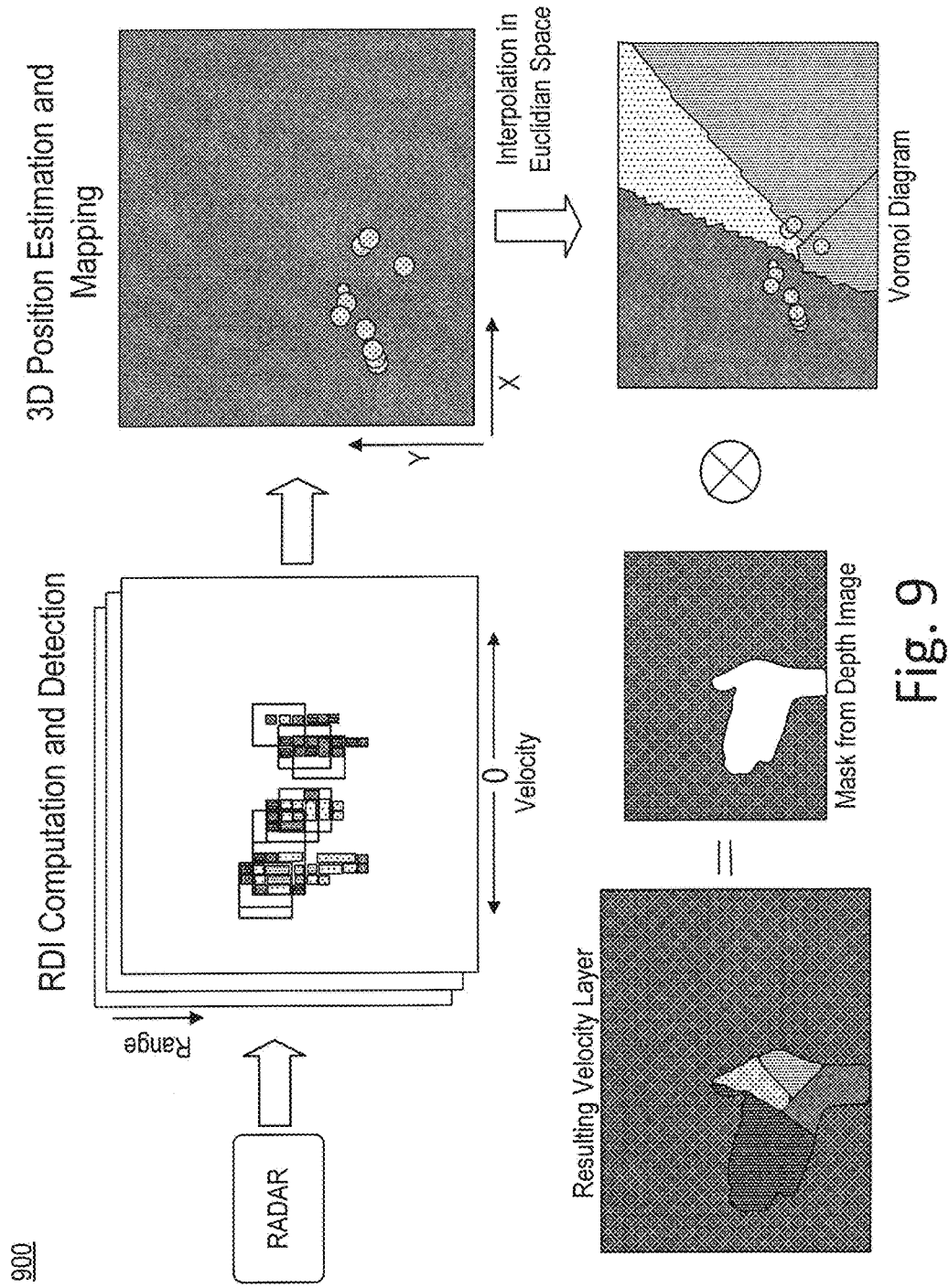
FIG. 9 shows an example data flow for processing of radar and depth data in accordance with various embodiments.

FIG. 9 shows an example data flow for processing of radar and depth data in accordance with various embodiments. FIG. 9 depicts radar feature extraction and combination with depth data. The sparse velocity values or 3D position estimation and mapping of moving objects (upper right) are determined based the radar data based on radar Doppler image (RDI) computation and detection. Interpolation in Euclidian space can then be performed. The resulting values are extrapolated across the hand region extracted from a depth camera by use of a Voronoi tesselation and the mask from the depth image. The resulting velocity layer or map can then be input into the DNN. In some embodiments, the resulting velocity layer is converted into a visual domain and provided with color or optical sensor data to the DNN which determines whether a gesture occurred and if so which particular gesture occurred.

In some embodiments, the hand region in the depth image is (first) segmented by assuming that it is the closest connected component to the depth camera and generating a mask for the hand region. The depth values of the detected hand region are normalized to the range of [0, 1]. The RGB image of the hand obtained from the color sensor is converted to a single grayscale image with normalized values in the range of [0, 1]. In some embodiments, the hand region may not be segmented in the color images.

In some embodiments, using the calibration information between the radar and the depth sensors, the system (e.g., system 100) can register the radar data to the depth images. By doing so, the system determines instantaneous angular velocity values for a sparse set of moving objects in the scene (e.g., FIG. 9). The system can extrapolate these sparse velocity values over the entire FOV of the depth camera, e.g., using Voronoi tessellation. The system may apply the mask for the segmented hand region to the velocity image to retain the velocity values of the hand region only. The result can be referred to as the radar image. The system can then resize the depth, grayscale and radar images to a predetermined size in pixels (e.g., 32×32 pixels) before being input to the classifier.

Figure 10:
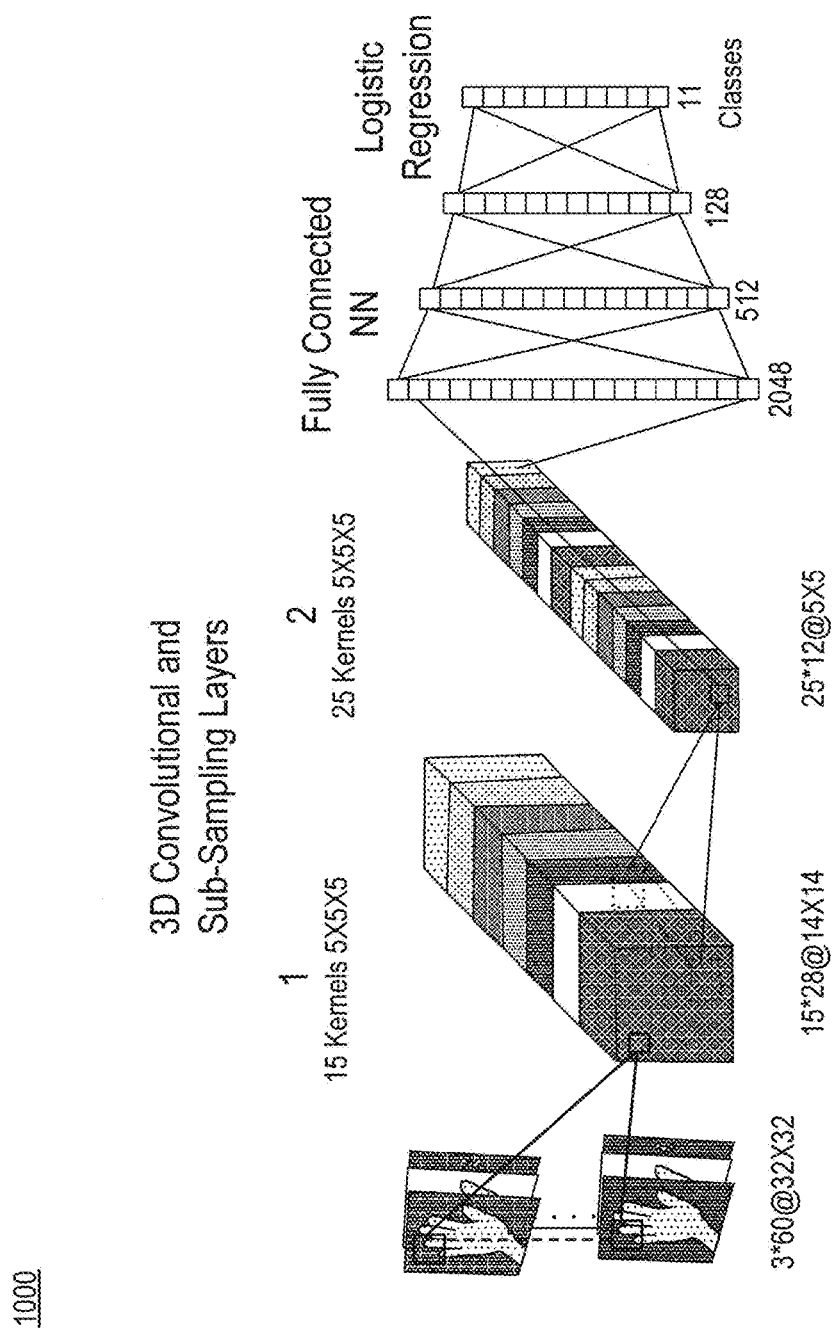
FIG. 10 shows an example neural network classifier structure in accordance with various embodiments.

In some embodiments, the system can represent a dynamic gesture by a batch of temporal frames, which are input to the classifier for gesture recognition (e.g., FIG. 10). For one example algorithm, each frame contains three channels, one for each of the three sensors. In some embodiments, the classifier requires inputs of constant size, e.g., equal number of frames for each gesture, while in reality the duration of the observed dynamic gestures is variable. Hence, gestures can be temporally normalized to a predetermined number of frames (e.g., 60 frames) by re-sampling them via nearest neighbor interpolation. For example, if the original gesture contains 80 frames, every 4th frame is removed and if the gesture contains 45 frames, every 3rd frame is repeated.

FIG. 10 shows an example neural network classifier structure in accordance with various embodiments. FIG. 10 depicts an example deep neural network (DNN) pipeline. The DNN classifier can be used for dynamic gesture recognition. The numbers on the bottom show example dimensionality of the data at the output of the corresponding layer (e.g., number of channels@XYT). The 3D convolution and sub-sampling layers perform spatial and temporal feature extraction. The 3D convolution and sub-sampling layers may further define labels for the features (e.g., how many fingers, motion of the features, etc.). The fully connected neural network portions can determine classifications by assembling features and applying weights to the features. The logistic regression can determine classes and the probability of a particular gesture based on the data.

In some embodiments, a convolutional deep neural network classifier is trained for recognizing different types of dynamic gestures. The DNN can include two 3D convolutional layers, which are configured to automatically learn discriminatory spatiotemporal filters to reduce the dimensionality of the input gesture data. For example, both convolutional layers contain 25 kernels of size 5×5×5 and hyperbolic tangent activation functions. Max-pooling layers that retain the maximum values in blocks of size 2×2×2 follow each of the convolutional layers. Two fully-connected layers follow the second max-pooling layer. They can have linear rectified activation functions and may contain 1024 and 128 neurons, respectively.

In some embodiments, the output layer implements multi-class logistic regression using a softmax function and produces posterior class conditional probabilities for each gesture type. The final decision can be made by selecting the class with the maximum posterior probability. For example, there can be nearly 7.8 million tunable weights in the network that are to be learned.

In some embodiments, the weights of the first two 3D convolution layers are initialized with random samples from a uniform distribution between $[-W_b, W_b]$, where $$W_b = \sqrt{\frac{6}{n_i + n_o}}, \quad (1)$$

and $n_i$ and $n_o$ are the number of input and output neurons, respectively. The biases of the first two layers are initialized with zero and the weights of the fully-connected hidden layers are initialized with random samples from a normal distribution of $N(0, 0.01)$. The biases with a value of one and the weights and biases of the output softmax layer are initialized to zero.

In some embodiments, the parameters of the DNN are learned or determined by means of a labelled training data set using the Theano package or open source Python library including characteristics that compute gradients for the (neural) network, efficient back-propagation using GPUs, dynamic C code generation, and speed and stability optimizations. The Theano package may be used to implement drop out for fully connected layers and momentum adaptation for learning rate. Training can be performed on a general-purpose computing on graphics processing units (GPGPU) capable GPU (e.g., CUDA capable Quadro 6000 NVIDIA GPU). DNN training can involve the minimization of the negative log-likelihood function via stochastic gradient descent optimization with mini-batches of 20 training samples. The parameters of the network can be updated at each back-propagation step i as $$\lambda_i = \frac{\lambda_0}{1 + i\alpha}, \quad (2a)$$

$$v_i = \underbrace{\mu v_{i-1}}_{\text{momentum}} - \underbrace{\lambda_i \left(\frac{\delta E}{\delta w}\right)_{batch}}_{\text{learning}}, \quad (2b)$$

$$w_i = \begin{cases} w_{i-1} + v_i - \underbrace{\gamma \lambda_i w_{i-1}}_{\text{weight decay}} & \text{if } w \text{ is a weight} \\ w_{i-1} + v_i & \text{if } w \text{ is a bias} \end{cases} \quad (2c)$$

where $\lambda_0$ is the initial learning rate, $\mu$ is the momentum coefficient, $$\left(\frac{\delta E}{\delta w}\right)_{batch}$$

is the gradient value of the cost function with respect to the parameter $w_i$ averaged over the mini batch, and $\gamma$ is the weight decay parameter. In some embodiments, the values of the training parameters (e.g., Equations 2a-c) are selected by cross-validation and are set to $\lambda_0=0.01$, $\mu=0.9$, and $\gamma=0.0005$.

In some embodiments, in order to improve the generalization capability of the network, the DNN is trained with drop-out. During drop-out, the outputs of the second, third, and fourth layers are randomly set to zero with p=0.5, and subsequently are not used in the back-propagation step of that iteration. For the forward propagation stage, the weights of the layer following the dropped layer are multiplied by two to compensate for the effect of drop-out. For example, the network may be trained for 200 epochs. To avoid an overfitting, early stopping can be employed by selecting the network configuration that results in the least error on the validation data set.

A number of procedures may be used to increase the accuracy of the system. For example, weight decay and dropout can prevent the network from overfitting to the training data and improved the classification accuracy by 2.3% on average. Augmenting the training dataset with transformed versions of the training samples can also help to improve the generalization capability of the DNN. In some embodiments, the same transformation is applied to each of the three sensor channels of each gesture, which included (a) adding salt and pepper noise, (b) random uniform temporal shifts of ±5 frames or temporal scaling between 80-120% of the entire gesture, or (c) random uniform spatial shifts between ±2 pixels, rotation between ±10 degrees, or scaling between 80-120% of each of the frames of the gesture.

Figure 11:
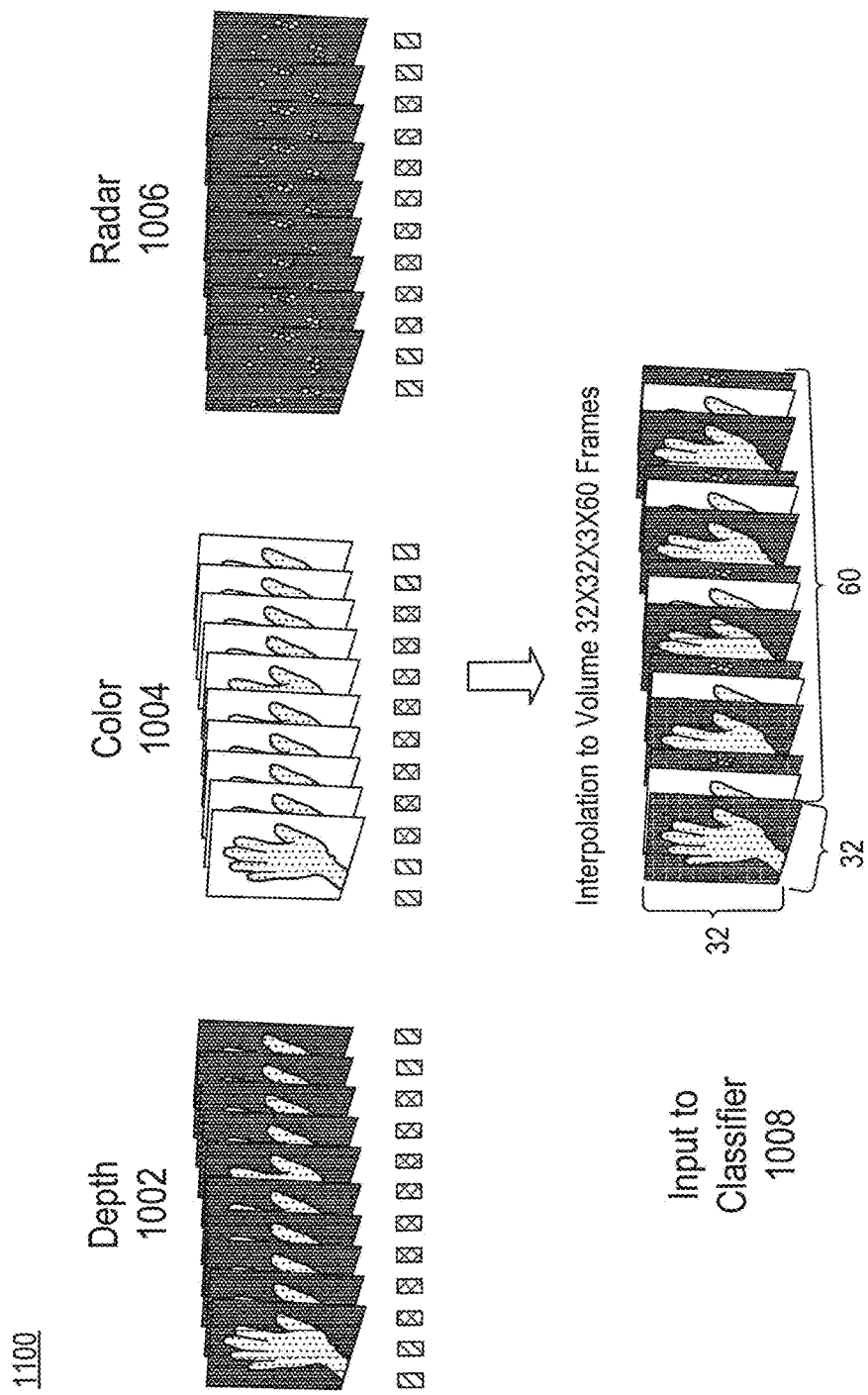
FIG. 11 shows an example input into a neural network in accordance with various embodiments.

FIG. 11 shows an example input into a neural network in accordance with various embodiments. FIG. 11 depicts the interpolation or resampling of depth images (or frames) 1002, color images (or frames) 1004, and radar images (or frames) 1006 received from respective sensors. This resampling can be performed to have a predetermined number of frames (e.g., 60 frames) for gesture recognition and adjust for variance in the speed of a gesture. For example, a first user may perform a gesture more quickly than another user. The resampling may include adding or discarding frames in order to result in the predetermined number of frames. In some embodiments, the velocity images received from radar are normalized for gesture length (e.g., the velocity are normalized for the gesture length). In some embodiments, each sensor is added as an extra layer to the data. The frames from each sensor may thus be interlaced.

Figure 12:
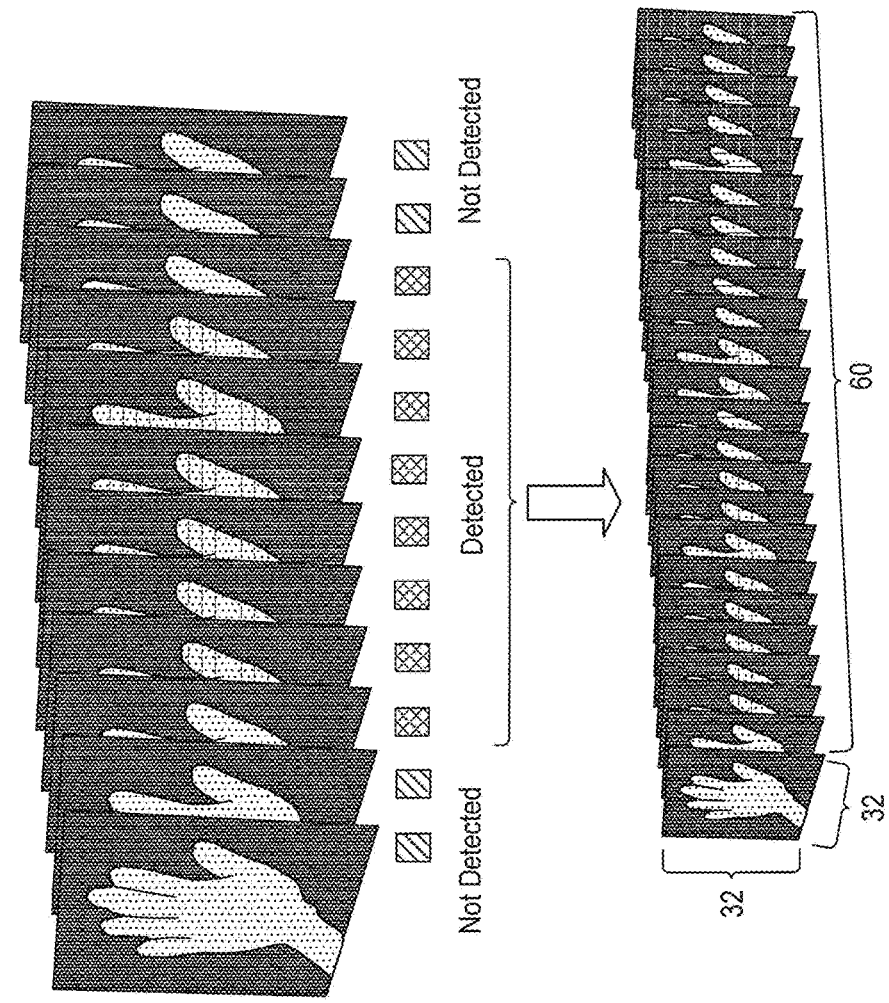
FIG. 12 shows example neural network processing of a single-sensor in accordance with various embodiments.

FIG. 12 shows example neural network processing of a single-sensor in accordance with various embodiments. FIG. 12 depicts the processing of data from a single sensor for which motion has been detected.

In some embodiments, motion is detected by the radar since the radar can easily and quickly detect motion. The motion can be detected by observing the radar velocity. For example, the system (e.g., the system 100) or radar system may detect a velocity and determine if the velocity is over a predetermined threshold. In some embodiments, gesture detection may be determined based on a gesture starting from a still position, the duration being between 0.3 and 3 seconds, and the gesture ending with a still position. The system may operate based on there being 0.5 seconds of no motion between gestures. In one embodiment, each frame is filtered down to 32×32 pixels and interpolated to a volume of 60 frames with a resolution of 32×32 pixels.

Figure 13:
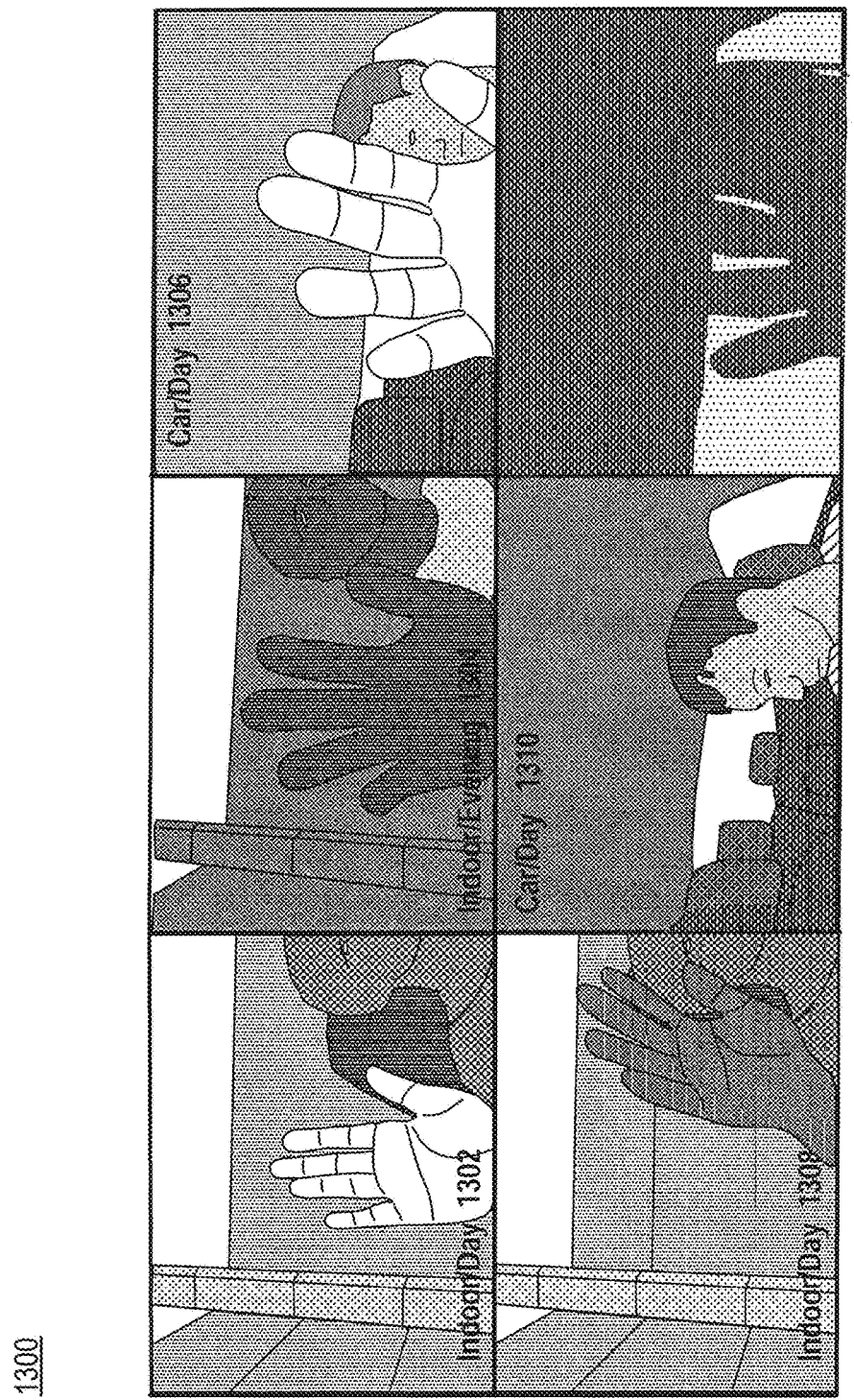
FIG. 13 shows example data collected in accordance with various embodiments.

FIG. 13 shows example data collected in accordance with various embodiments. FIG. 13 depicts various example conditions of captured data including indoor/day 1302 and 1308, indoor/evening 1034, car/day 1306 and 1310, and car/evening 1312. In an example data collection, ten experiments of ten gesture types were repeated ten times for each of three people. This resulted in 1000 total gestures with a random separation including 600 gestures, 200 validation gestures, and 200 testing gestures.

Gesture data can be collected indoors in a driving simulator and outdoors in a real car. For safety reasons, each gesture can be performed with the car in a parked position. The example data acquired can include (a) indoors in artificial lighting at night and under indirect sunlight during the day, and (b) outdoors in a car under direct/indirect sunlight during the day and in the absence of light at night (e.g., FIG. 13). For example, data can be collected in ten distinct recording sessions. A session can include several repetitions of each gesture performed by one subject in a particular environment.

An example database may contain a total of 1714 gestures of three subjects. The gestures can include a left/right/up/down palm motion, shaking of the hand, clockwise/counterclockwise hand rotations, a left/right swipe, and calling motion. Each subject performed 10 to 20 repetitions of every gesture. In addition to these ten premeditated gestures, a set of random hand motions of each subject were also acquired. Two different experimental setups were used for gesture data acquisition, e.g., outdoors in a real car and indoors in a driving simulator.

The performance of the gesture classification system was evaluated for the two experiments with different partitioning of the database. Leave-one-session-out and leave-one-subject-out cross-validation was performed. The performance of the DNNs was evaluated with input from individual sensors, pairs of sensors and all three sensors. When a sensor was not used, its input values were set to zero. The DNNs were individually trained and tested for different sensor types and their combinations.

The average Precision, Recall, and F-score, and the accuracy of the gesture recognition system was computed. Precision is defined as TP/(TP+FP), where TP and FP are the number of true and false positives, respectively. Recall is defined as TP/(TP+FN), where FN is the number of false negatives. The F-score is defined as 2*Precision*Recall/(Precision+Recall). These values were estimated for each of 11 gesture classes and then averaged together to produce single values. In addition, the accuracy of the system was calculated as the proportion of test cases that were correctly classified.

In some embodiments, for leave-one-session-out cross-validation, each of the 10 gesture recording sessions can be left out from the training set once. The gestures are split from the left-out session evenly (50/50) into validation and test sets. The results can be averaged, taking into account the number of samples, of all sessions to generate the aggregate performance statistics for the system. This process is designed to evaluate the generalization performance of the classifier to data acquired under different lighting conditions.

TABLE I

The classification performance (%) of leave-one-session-out cross-validation for different input sensors.

|  | Optical (O) | Depth (D) | Radar (R) | DR | DO | RO | DRO |
|---|---|---|---|---|---|---|---|
| Precision | 70.3 | 92.4 | 90.0 | 92.9 | 93.1 | 93.3 | 94.7 |
| Recall | 60.1 | 91.5 | 90.0 | 91.9 | 92.4 | 92.9 | 94.2 |
| Fscore | 63.1 | 91.6 | 89.3 | 92.3 | 92.5 | 93.0 | 94.3 |
| Accuracy | 60.1 | 90.9 | 89.1 | 91.7 | 92.1 | 92.6 | 94.1 |

The classification performance of DNNs with different sensors for leave-one-session-out cross-validation is presented in Table I. Among the individual sensors, the best results were achieved by the depth sensor (accuracy=90.9%), followed by the radar sensor (accuracy=89.1%). The worst performance was achieved by the optical sensor (accuracy=60.1%). Employing two sensors improved the accuracy relative to the individual sensors: DR (depth and radar) increased the accuracy of the individual depth and radar sensors by 0.7% and 0.8%, respectively, DO (depth and optical) by 0.9% and 1.2%, and RO (radar and optical) by 3.7% and 2.5%. The best overall performance (accuracy=94.1%) was achieved by a combination of all three sensors. This neural network achieved an accuracy of 3.2% higher than the depth only sensor. It is noted that the addition of the radar sensor to the depth and optical sensors (DO) improved its accuracy by 2%.

counterclockwise (CCW) rotation (classes 1508-1509), and calling (class 1510), (e.g., with the hand moving toward a user).

Figure 16:
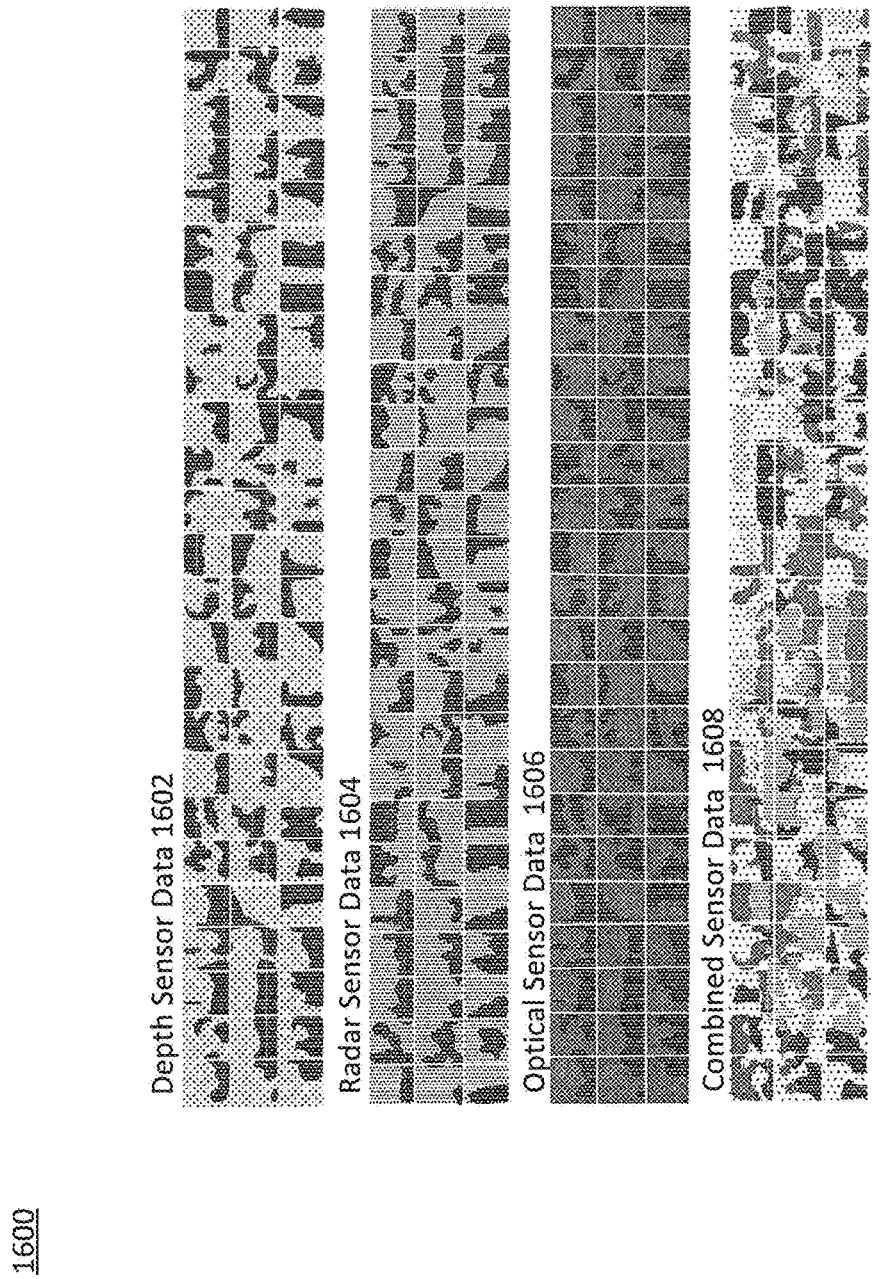
FIG. 16 shows example projections of kernels learned at a first 3D convolution layer of a neural network in accordance with various embodiments.

FIG. 16 shows example projections of kernels learned at a first 3D convolution layer of a neural network in accordance with various embodiments. FIG. 16 depicts kernels

TABLE II

Confusion matrix of the multi-sensor network (Depth + Radar + Optical) for leave-one-session-out cross-validation.

| | Decision | | | | | | | | | | |
|---|---|---|---|---|---|---|---|---|---|---|---|
| Truth | Unknown | Left | Right | Up | Down | Swipe Left | Swipe Right | Shake | CW | CCW | Call |
| Random | 93.3 | 0 | 1.1 | 2.2 | 0 | 0 | 1.1 | 0 | 0 | 0 | 2.2 |
| Left | 0 | 97.8 | 2.2 | 0 | 0 | 0 | 0 | 0 | 0 | 0 | 0 |
| Right | 0 | 0 | 100. | 0 | 0 | 0 | 0 | 0 | 0 | 0 | 0 |
| Up | 10.9 | 0 | 0 | 89.1 | 0 | 0 | 0 | 0 | 0 | 0 | 0 |
| Down | 5.9 | 0 | 0 | 0 | 94.1 | 0 | 0 | 0 | 0 | 0 | 0 |
| Swipe L | 0 | 0 | 0 | 0 | 0 | 97.1 | 1.5 | 0 | 0 | 0 | 1.5 |
| Swipe R | 0 | 0 | 0 | 0 | 0 | 0 | 97. | 0 | 0 | 0 | 3. |
| Shake | 1.6 | 0 | 0 | 4.8 | 0 | 11.3 | 0 | 82.3 | 0 | 0 | 0 |
| CW | 1.8 | 0 | 0 | 0 | 0 | 0 | 0 | 0 | 98.2 | 0 | 0 |
| CCW | 0 | 1.5 | 0 | 0 | 0 | 0 | 0 | 0 | 1.5 | 97. | 0 |
| Call | 4.9 | 1.6 | 0 | 0 | 0 | 0 | 3.3 | 0 | 0 | 0 | 90.2 |

The confusion matrix for the neural network with all three sensors (DRO) for leave-one-session-out cross-validation is shown in Table II. It is noted that most classes were classified correctly. The highest miss-classification rate of 17.7% was observed when class 8 (shake) was miss-classified as class 6 (swipe left).

Figure 14:
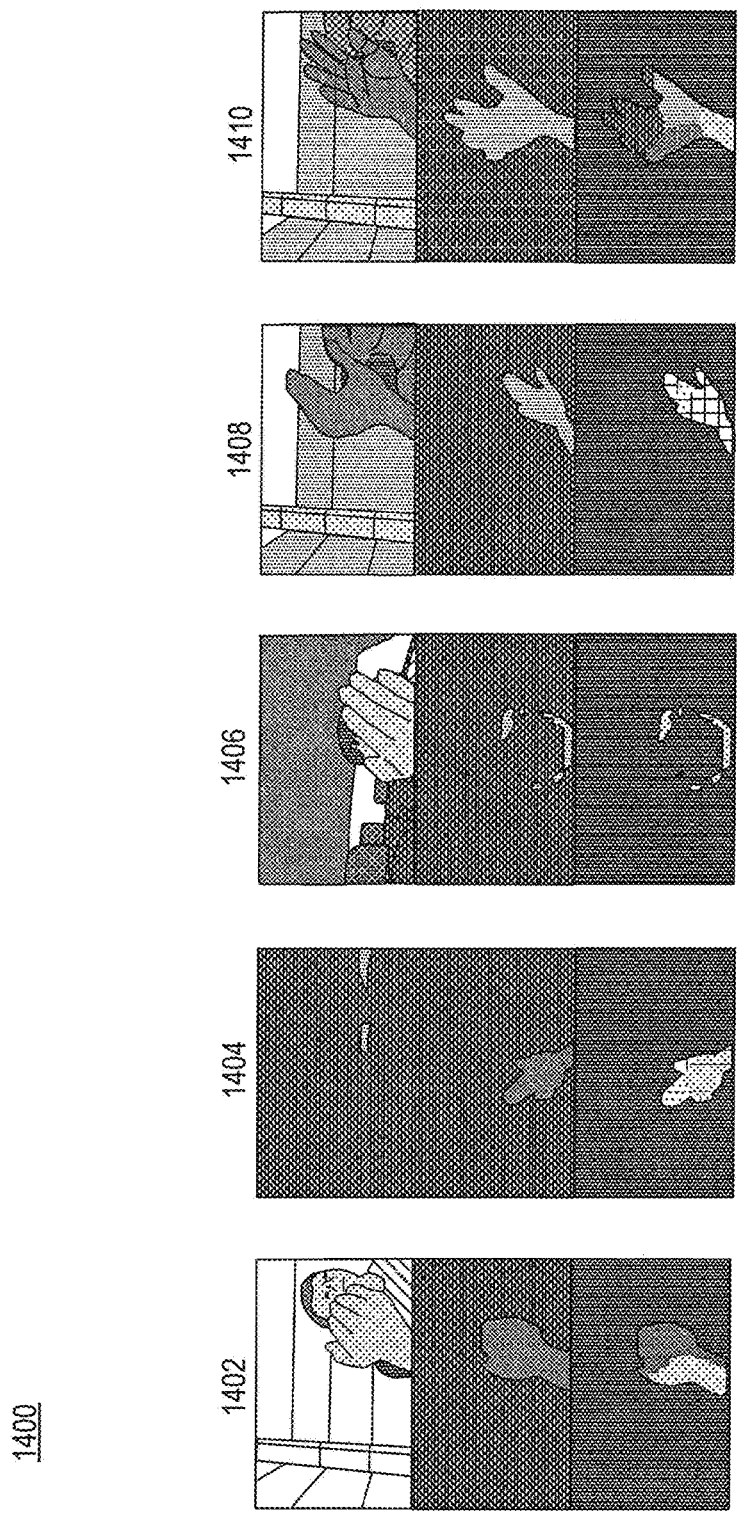
FIG. 14 shows example dynamic gesture inputs from different sensors in accordance with various embodiments.

FIG. 14 shows example gestures under various conditions in accordance with various embodiments. FIG. 14 depicts example of gesture inputs 1400 with each column representing a different environmental condition: indoors 1402, nighttime inside a car 1404, daytime inside a car 1406, daytime indoors 1408, and nighttime indoors 1410 from left to right. The inputs from different sensors are shown in each row: optical, depth, and radar from top to bottom. The colors or brightness levels in the third row indicate the instantaneous angular velocity measured by the radar sensor.

Figure 15:
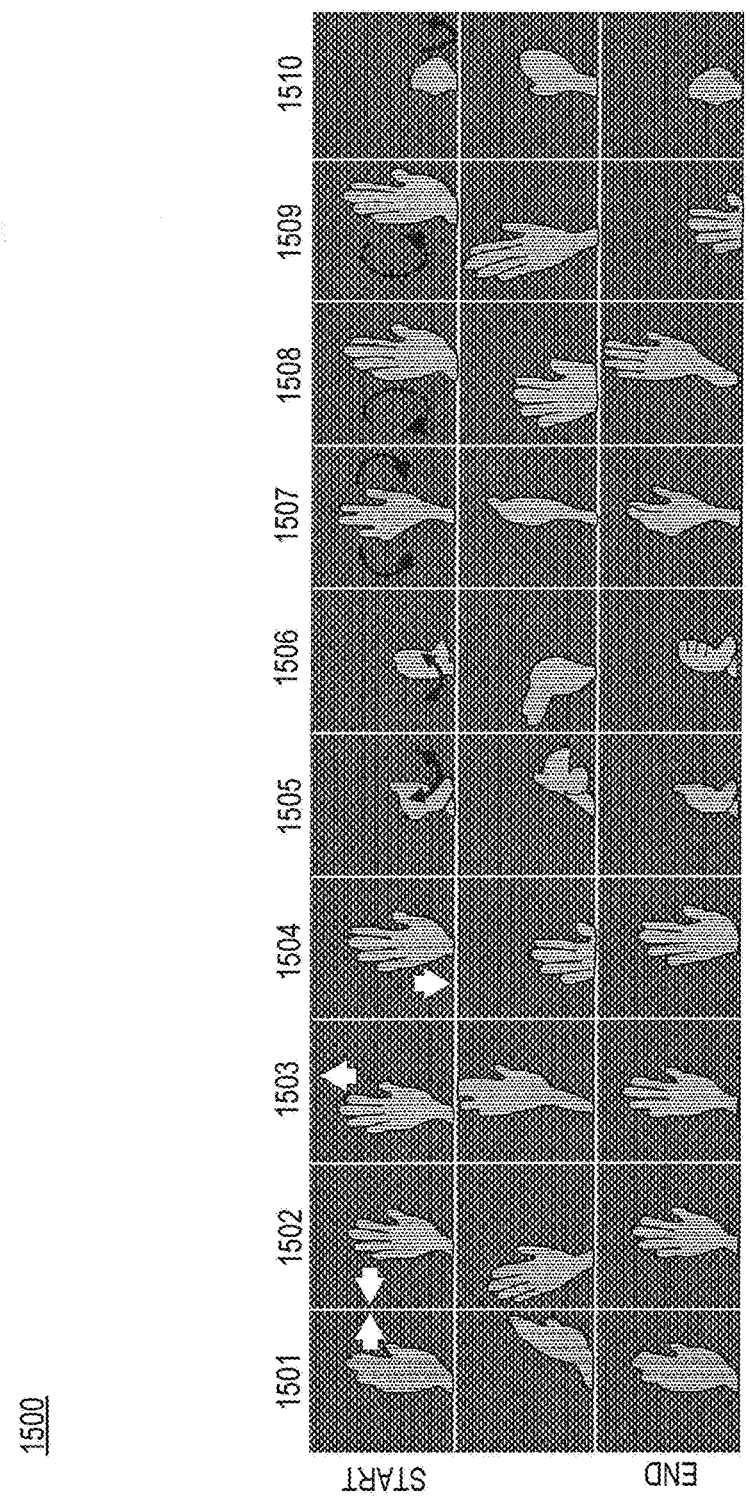
FIG. 15 shows example images captured with a depth sensor and with an optical sensor under various conditions in accordance with various embodiments.

FIG. 15 shows example gesture types in accordance with various embodiments. FIG. 15 depicts ten different dynamic gestures used for training an example system: moving left/right/up/down (classes 1501-1504), swiping left/right (classes 1505-1506), shaking (class 1507), clockwise (CW)/ learned by the first convolutional layer of DNN that employs depth data 1602, radar data 1604, optical data 1606, and combined (e.g., DRO) data 1608. Assuming that x and y are spatial dimensions, and t is the temporal dimension, projections of the learned convolutional kernels on to the yt, xt, and xy planes are depicted. It is noted that all three sensors contributed towards the final decision made by the network. This suggests that the depth, radar, and optical sensors encode complementary information, which helps to improve the accuracy of gesture recognition.

In some embodiments, for leave-one-subject-out cross-validation, the system is evaluated with all three sensors contributing to the decision making (e.g., by the DRO network). This helps to evaluate the generalization capability of the system to detect and recognize gestures of unseen subjects. Data from each of the three subjects in our database is reserved and training is done with data from the two remaining subjects. An example gesture recognition system achieved a classification accuracy of 75.1±5.4% in this experiment.

TABLE III

Confusion matrix of the multi-sensor network (Depth + Radar + Optical) for leave-one-subject-out cross-validation.

| | Decision | | | | | | | | | | |
|---|---|---|---|---|---|---|---|---|---|---|---|
| Truth | Unknown | Left | Right | Up | Down | Swipe Left | Swipe Right | Shake | CW | CCW | Call |
| Random | 100 | 0 | 0 | 0 | 0 | 0 | 0 | 0 | 0 | 0 | 0 |
| Left | 0 | 100 | 0 | 0 | 0 | 0 | 0 | 0 | 0 | 0 | 0 |
| Right | 9.0 | 0 | 66.9 | 0 | 0 | 0 | 18.0 | 0 | 6.1 | 0.0 | 0 |
| Up | 27.2 | 0 | 0 | 60.8 | 12.0 | 0 | 0 | 0 | 0 | 0 | 0 |
| Down | 17.1 | 0 | 0 | 0 | 76.3 | 0 | 0 | 0 | 6.6 | 0 | 0 |
| Swipe L | 0 | 0 | 0 | 0 | 0 | 85.9 | 0 | 2 | 0 | 0 | 12.1 |
| Swipe R | 0 | 0 | 0 | 0 | 0 | 0 | 79.2 | 0 | 0 | 0 | 20.8 |
| Shake | 3.3 | 0 | 0 | 5.0 | 2.5 | 34.5 | 0 | 48.9 | 2.5 | 0 | 3.3 |
| CW | 0 | 0 | 0 | 0 | 0 | 0 | 0 | 0 | 95.6 | 10 | 4.3 |
| CCW | 0 | 2.8 | 0 | 0 | 8.5 | 0 | 0 | 0 | 0 | 88.6 | 0 |
| Call | 19.3 | 0 | 0 | 6.4 | 5.0 | 29.9 | 19.9 | 0 | 0 | 0 | 19.3 |

The confusion matrix of the DRO network for leave-one-subject-out cross-validation is shown in Table III. The lowest correct classification rate was observed for class 11

(call). The up gesture (class 4) was frequently miss-classified as a random gesture (class 1). The shake gesture (class 8) was miss-classified as a swipe left gesture 34.5% of the times. The left palm motion, clockwise and counterclockwise rotation, and the swipe left gestures were classified correctly most of the time. It is noted that none of the random gestures were miss-classified as a premeditated gesture.

In some embodiments, the gesture recognition system is designed to operate inside a car under varied lighting conditions. Ohn-Bar and Trivedi also proposed a solution for this problem using RGBD (red, green, blue, and depth) data. They compared a number of different feature extraction techniques together with a SVM classifier. They obtained their best results with HOG and HOG2 features extracted from the segmented gesture's video and an SVM classifier with the $\chi 2$ kernel function. In some embodiments, their technique can be implemented on data from the above described system (e.g., system 100) with the following modifications: (a) gestures of a size 32×32×60 frames are used as inputs to the classifier to fit the dataset; (b) instead of RGBD data gray-scale and depth images are used; and (c) the scaling parameter $\gamma$ is selected for the $\chi 2$ kernel function and the regularization parameter C for training the SVM classifier is selected using a grid search performed on the validation set. For the HOG features, cell sizes of 4×4, 8×8 and 16×16 pixels can be evaluated and the best results may be obtained for cells of size 8×8.

On our dataset, Ohn-Bar and Trivedi's method resulted in accuracies of 88.2% and 51.8%±21.83% for the leave-one-session-out and leave-one-subject-out cross-validation experiments, respectively. The algorithm of some embodiments outperformed their method by 5.9% and 23.3%, respectively.

TABLE IV

The correct classification rates (%) for the DR and DRO DNN-based classifiers and Ohn-bar and Trivedi's method (DO) for sessions recorded under different lighting conditions.

|  | DR | DRO | (DO) |
|---|---|---|---|
| Night | 93.3 | 93.3 | 77.8 |
| Evening | 97.0 | 98.5 | 97.54 |
| Day (shadow) | 90.3 | 91.7 | 87.0 |
| Day (sunlight) | 79.1 | 92.5 | 79.1 |

A comparison of the correct classification rates of various classifiers for gesture sessions conducted under different lighting conditions is presented in Table IV. It is noted that adding the optical sensor to the DR network at night did not change the accuracy of the system. For data acquired in the evening and during the day under shadows, the optical sensor improved the accuracy by 1.5%. During the day, under bright sunlight, adding the optical sensor considerably improved the accuracy by 13.4%. Ohn-Bar and Trivedi's method shows comparable performance in the evening and during the day under shadows, where all sensors provide reliable data. However, at night where the intensity data is unreliable and during the day under bright sunlight where the depth data is unreliable, the performance of their algorithm decreases. This result suggests that in comparison to SVMs DNNs are more affective at merging partially reliable data from multiple sensors.

In an example, embodiment, an Intel i7 CPU was used to determine a gesture in 350 ms. In another example embodiment, an off-the-shelf CUDA implementation of the gesture recognition system ran in 52 ms on a Quadro 6000 NVIDIA GPU. With a memory transfer for the gesture recognition was observed at 206 ms.

Embodiments are further able to conserve power. In an example embodiment, the system can operate with only the lower-powered (1 W) radar being ON constantly, while the imaging sensors (2.5 W) are switched ON for the duration of a gesture. Based on ten gestures/hour being performed for an average duration of 2 s each, the design of the example embodiment results in ~50% reduction in power (1.14 W) versus an always-ON pure imaging (depth and optical) solution (2.5 W). Furthermore, a power-optimized version of the radar prototype (15 mW) would result in ~16× lower power (0.154 W) consumption versus a purely imaging system.

Figure 17:
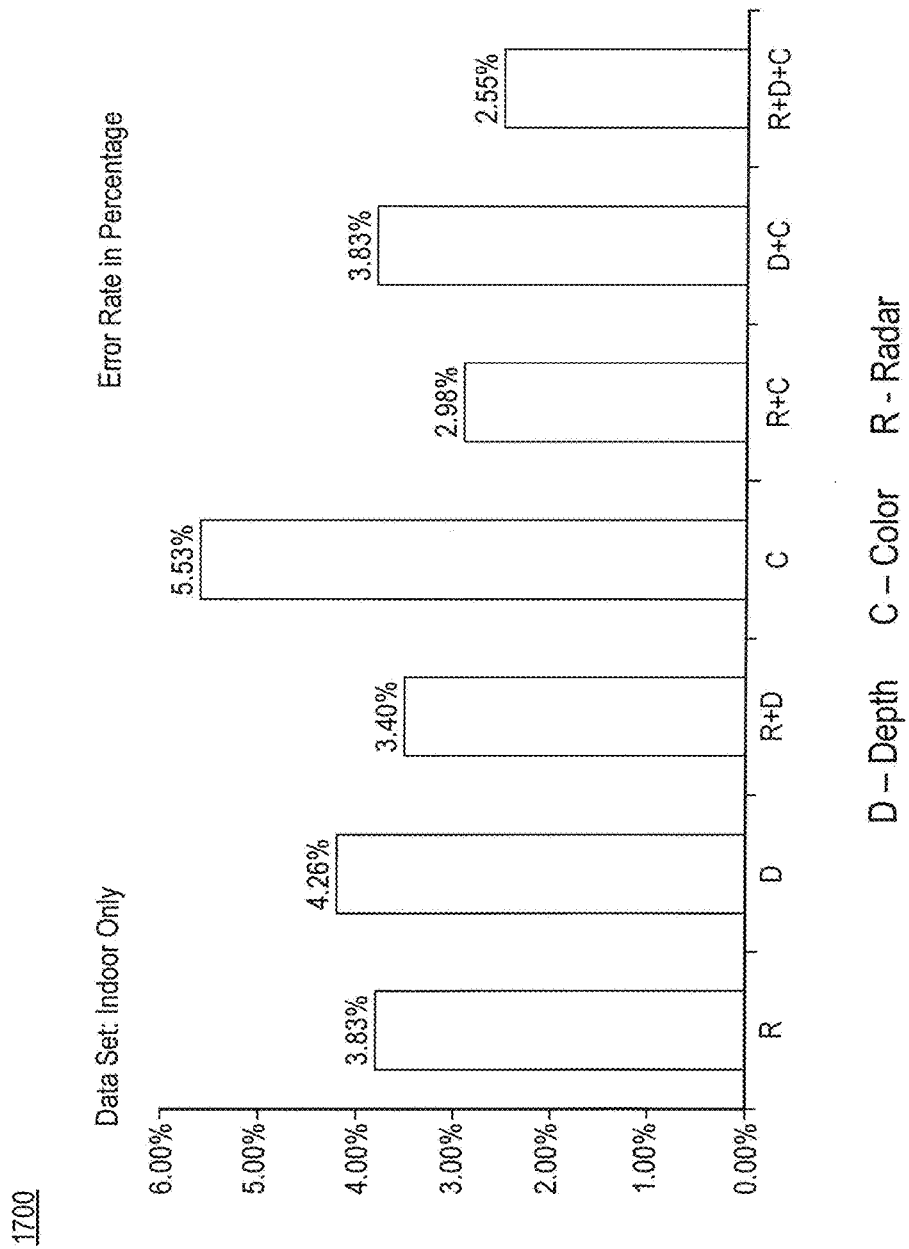
FIG. 17 shows example classification results of indoor sensor operation in accordance with various embodiments.

FIG. 17 shows example classification results of indoor sensor operation in accordance with various embodiments. FIG. 17 depicts example error rates in percentages of indoor datasets for various sensors, e.g., radar, depth, and color, and combinations thereof. It is noted that the lowest error rate percentage was observed with use of radar, depth, and color in combination.

Figure 18:
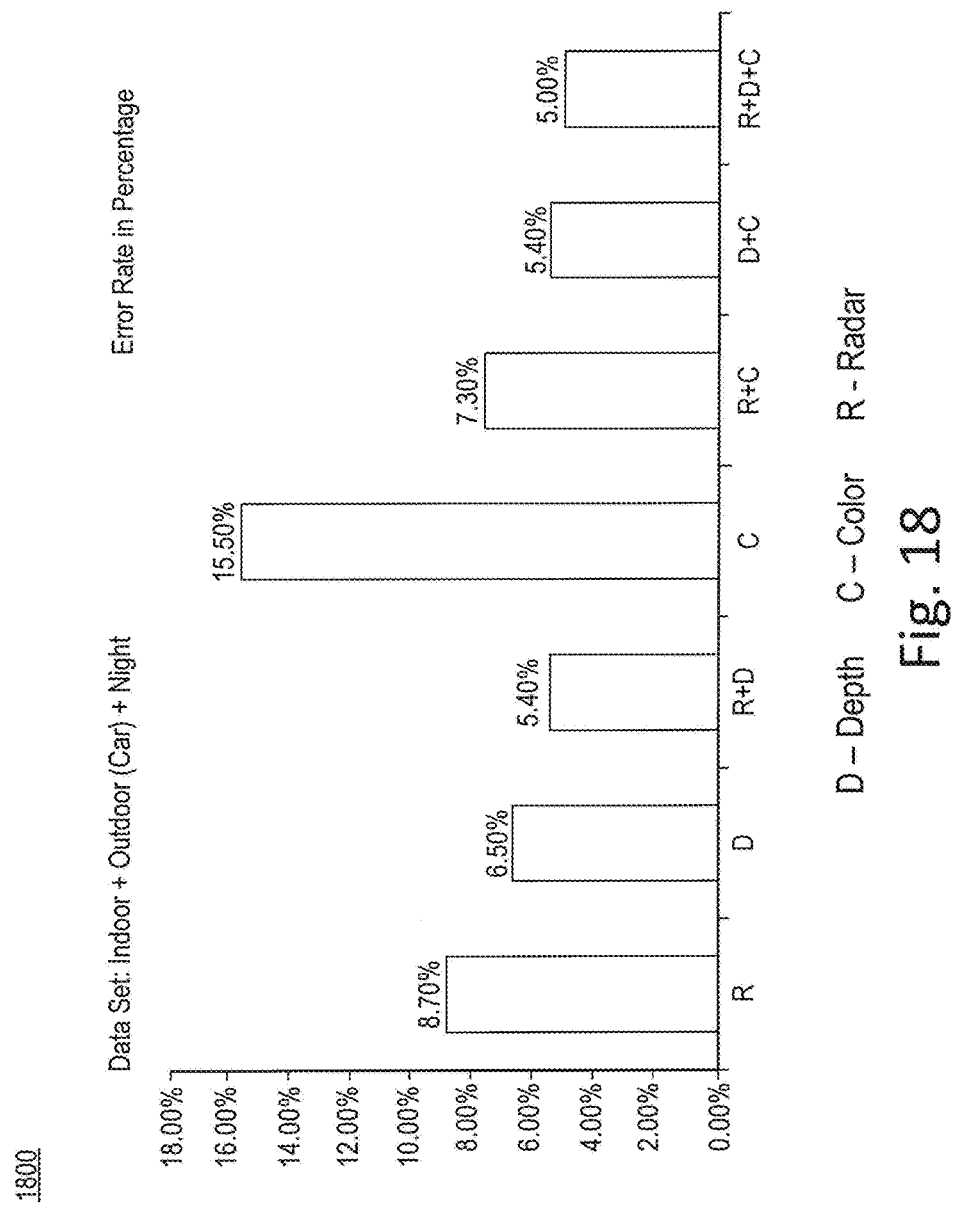
FIG. 18 shows example classification results of indoor, outdoor, and night conditions sensor operation in accordance with various embodiments.

FIG. 18 shows example classification results of indoor, outdoor, and night conditions sensor operation in accordance with various embodiments. FIG. 18 depicts example error rates in percentages of a dataset under indoor, outdoor, and night time conditions with various sensors, e.g., radar, depth, and color, and combinations thereof. It is noted that the lowest error rate percentage was observed with use of radar, depth, and color in combination. An average increase in accuracy of 5.32% (1.99% for indoor only) was observed by combination data from the three sensors versus using any individual sensor.

Figure 19:
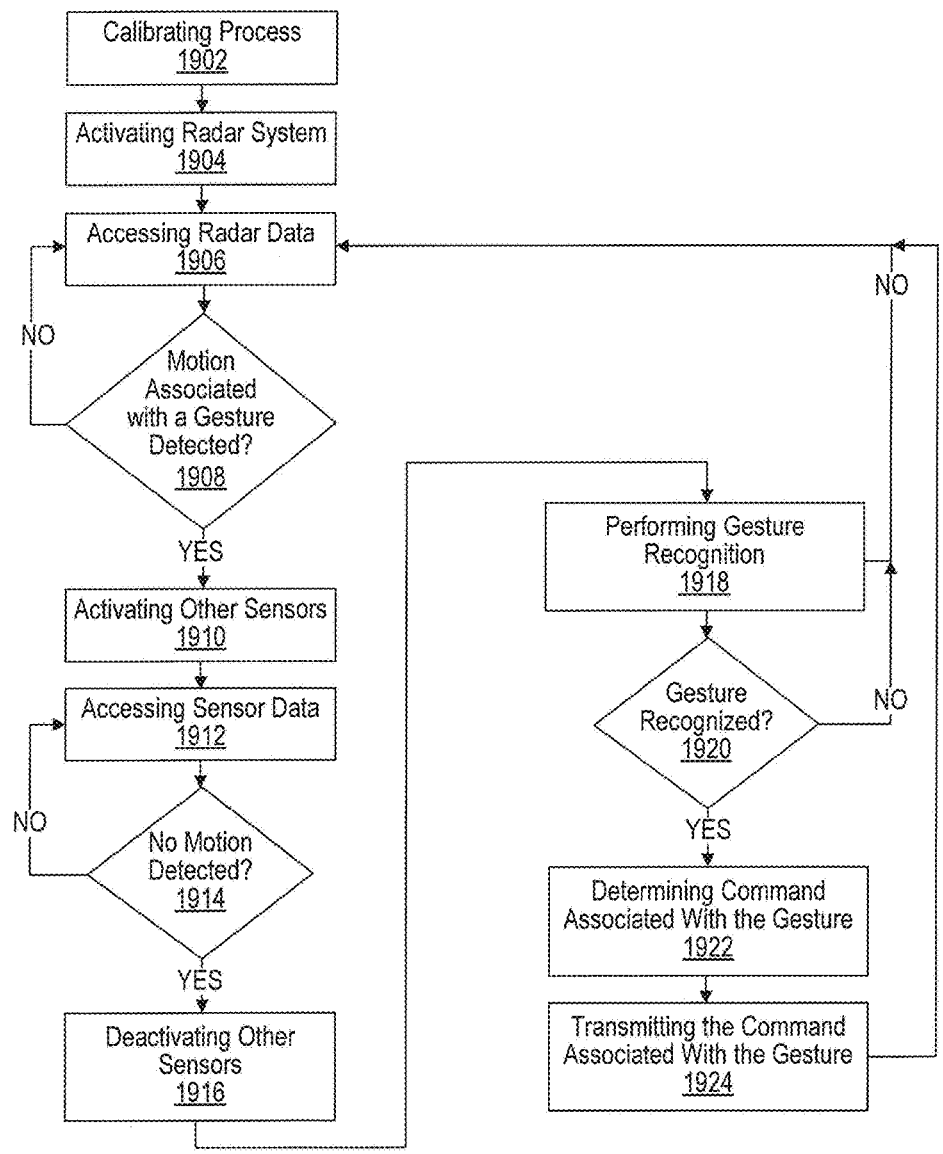
FIG. 19 shows a flowchart of an example computer controlled process for processing sensor data in accordance with various embodiments.

With reference to FIG. 19, flowchart 1900 illustrates example functions used by various embodiments of the present invention. Although specific function blocks ("blocks") are disclosed in flowchart 1900, such steps are examples. That is, embodiments are well suited to performing various other blocks or variations of the blocks recited in flowchart 1900. It is appreciated that the blocks in flowchart 1900 may be performed in an order different than presented, and that not all of the blocks in flowchart 1900 may be performed.

FIG. 19 shows a flowchart of an example computer controlled process for processing sensor data in accordance with various embodiments. FIG. 19 depicts an example process 1900 that may be performed by a system (e.g., the system 100) for detecting and determining a gesture based data received from multiple sensors.

At block 1902, calibration is performed. As described herein, calibration of a plurality of sensors may be performed to allow transformation of data from each sensor into a single domain with common center. The calibration may be performed after a plurality of sensors (e.g., optical, depth, and radar sensors) have been attached to a device or vehicle, as described herein.

At block 1904, a radar system is activated. As described herein, a radar system (e.g., with one transmitter and three receivers) can be powered on and put into an always-on mode.

At block 1906, radar data is accessed. The radar data may be received from a radar system (e.g., the radar system 106) that is in an always-on mode while other sensors (e.g., the optical sensor 102 and the depth sensor 104) are in an off or low power state thereby conserving power. In some embodiments, the radar data may be stored in a buffer and accessed from the buffer to detect motion.

At block 1908, whether motion associated with a gesture has been detected is determined. In some embodiments, motion above a threshold for a predetermined length of time is determined to be motion associated with a gesture. For example, motion above the threshold for a period shorter than the predetermined amount of time may be determined to not be motion associated with a gesture. Motion above the threshold for a period longer than the predetermined amount of time may be determined to be motion associated with a gesture. If motion associated with a gesture is detected, block 1910 is performed. If motion associated with a gesture is not detected, block 1906 is performed.

At block 1910, other sensors are activated. In some embodiments, upon detecting of motion associated with a gesture, a depth sensor and an optical sensor are activated, as described herein.

At block 1912, data is collected with the sensors. As described herein, data from a depth sensor, an optical sensor (e.g., camera), and radar can be collected and stored (e.g., in a buffer), as described herein.

At block 1914, whether no motion has been detected is determined. Whether motion has stopped or there is no motion may be detected based on detecting that a user's hand has stopped moving. If no motion is detected, block 1916 is performed. If motion is detected, block 1912 is performed.

At block 1916, the other sensors are deactivated. In some embodiments, an optical sensor and a depth sensor are powered down to reduce power consumption, as described herein.

At block 1918, a gesture recognition process is performed. The gesture recognition process may be performed with a deep neural network, as described herein.

At block 1920, whether the motion is a gesture recognized by the system (e.g., or a gesture known by the system) is determined. If a gesture was recognized, block 1922 is performed. If no gesture was recognized, block 1906 is performed.

At block 1922, a command associated with the recognized gesture is determined. The command may be for a navigation, an audio, or control system of a vehicle or other device, as described herein. In some embodiments, the commands associated with particular gestures may be user configurable.

At block 1924, the command is transmitted. In some embodiments, the command is transmitted to a selected system which can include a navigation system, information and entertainment or infotainment, or control systems (e.g., air conditioning). Block 1906 may then be performed.

Example Computer System Environment

Figure 20:
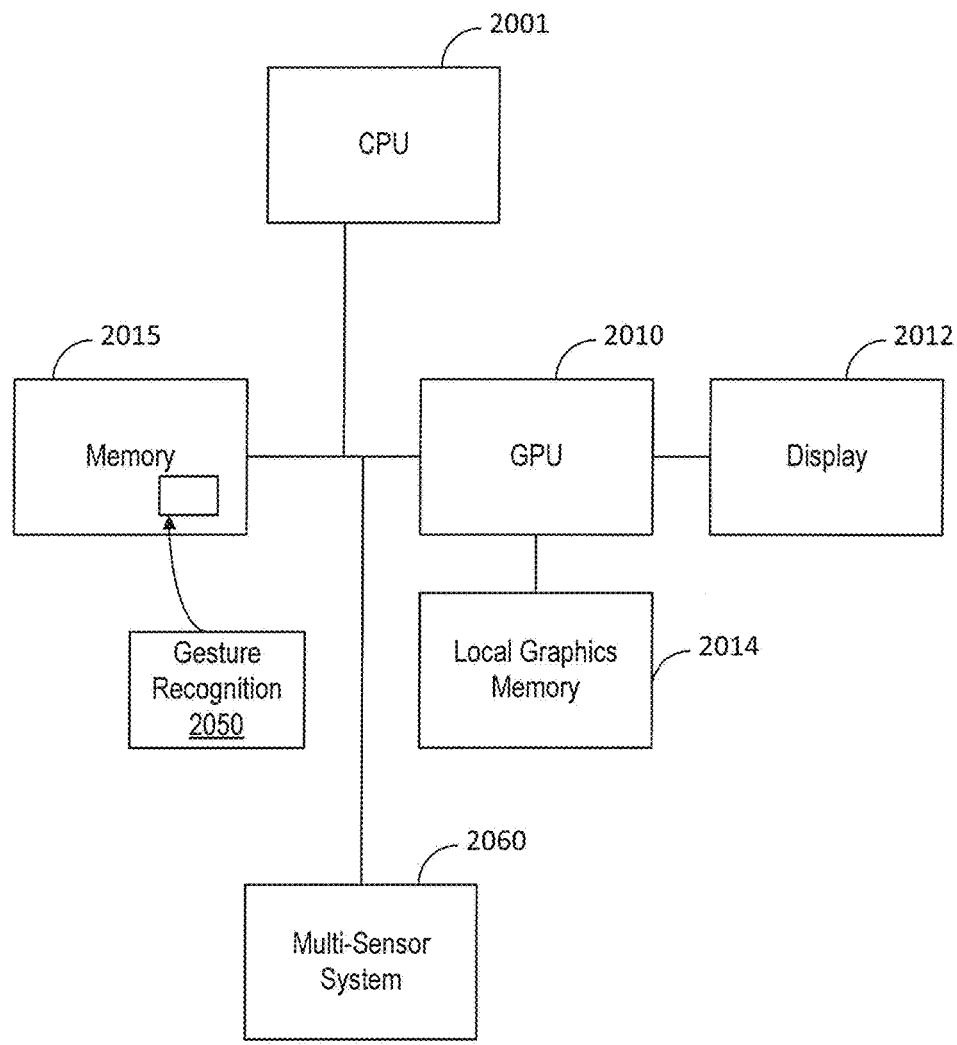
FIG. 20 shows an example computer system in accordance with various embodiments.

FIG. 20 shows a computer system 2000 in accordance with one embodiment of the present invention. Computer system 2000 depicts the components of a basic computer system in accordance with embodiments of the present invention providing the execution platform for certain hardware-based and software-based functionality. In general, computer system 2000 comprises at least one CPU 2001, a system memory 2015, and may include at least one graphics processor unit (GPU) 2010. The CPU 2001 can be coupled to the system memory 2015 via a bridge component/memory controller (not shown) or can be directly coupled to the system memory 2015 via a memory controller (not shown) internal to the CPU 2001. The GPU 2010 may be coupled to a display 2012. One or more additional GPUs can optionally be coupled to system 2000 to further increase its computational power. The GPU(s) 2010 is coupled to the CPU 2001 and the system memory 2015. The GPU 2010 can be implemented as a discrete component, a discrete graphics card designed to couple to the computer system 2000 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 2014 may be included for the GPU 2010 for high bandwidth graphics data storage. The computer system 2000 may be coupled to a multi-sensor system 2060 (e.g., the system 100), as described herein.

The CPU 2001 and the GPU 2010 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 2010 can also be implemented in, and performed by, a suitably equipped CPU 2001. Additionally, while embodiments herein may make reference to a GPU, it should be noted that the described circuits and/or functionality can also be implemented and other types of processors (e.g., general purpose or other special-purpose coprocessors) or within a CPU.

System 2000 can be implemented as, for example, a desktop computer system or server computer system having a powerful general-purpose CPU 2001 coupled to a dedicated graphics rendering GPU 2010. In such an embodiment, components can be included that add peripheral buses, specialized audio/video components, IO devices, and the like. Similarly, system 2000 can be implemented as vehicle dashboard component, a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 2000 can also be implemented as a "system on a chip", where the electronics (e.g., the components 2001, 2015, 2010, 2014, and the like) of a computing device are wholly contained within a single integrated circuit die. Examples include a hand-held instrument with a display, a car navigation system, a portable entertainment system, and the like.

In one exemplary embodiment, GPU 2010 is operable for general-purpose computing on graphics processing units (GPGPU) computing. General-purpose computing on graphics processing units (GPGPU) programs or applications may be designed or written with the Compute Unified Device Architecture (CUDA) framework and Open Computing Language (OpenCL) framework. GPU 2010 may execute Compute Unified Device Architecture (CUDA) programs and Open Computing Language (OpenCL) programs. It is appreciated that the parallel architecture of GPU 2010 may have significant performance advantages over CPU 2001.

In some embodiments, the memory 2015 includes a gesture recognition program 2050 for recognizing, classifying, and determining gestures (e.g., using a neural network), as described herein, and translating the gestures into commands (e.g., enabling control of the computer system 2000).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for gesture detection and recognition, the apparatus comprising:
   a processing element;
   a radar sensor;
   a depth sensor; and
   an optical sensor, wherein the radar sensor, the depth sensor, and the optical sensor are coupled to the processing element, and wherein the radar sensor, the depth sensor, and the optical sensor are configured for short range gesture detection and the processing element is configured to identify a type of hand gesture by combining data acquired with the radar sensor, data acquired with the depth sensor, and data acquired with the optical sensor, wherein the data acquired with the radar sensor is registered to the data acquired with the depth sensor,
   wherein registering the data acquired with the radar sensor to the data acquired with the depth sensor comprises transforming three-dimension (3D) coordinates of the data acquired with the radar sensor to the depth sensor's coordinate frame, wherein said registering further comprises: observing 3D coordinates of a spherical volume concurrently with both the radar sensor and the depth sensor, determining a best-fit transformation function between the 3D coordinates of the spherical volume observed by both the radar sensor and the depth sensor, and using the transformation function to transform the 3D coordinates of the data acquired with the radar sensor to the depth sensor's coordinate frame.

2. The apparatus as described in claim 1, wherein the radar sensor is in an always-on mode during a period in which the depth sensor and the optical sensor are turned off, wherein the depth sensor and the optical sensor are activated and a gesture recognition process to identify the type of hand gesture is performed only in response to the radar sensor detecting an amount of motion above a threshold amount that lasts for at least a threshold length of time.

3. The apparatus as described in claim 1, wherein the radar sensor, the depth sensor, and the optical sensor are a portion of a user interface device of a vehicle.

4. The apparatus as described in claim 1, wherein a portion of the processing element is configured to function as a deep neural network (DNN).

5. The apparatus as described in claim 4, wherein the DNN comprises two 3D convolutional layers and two fully-connected layers.

6. The apparatus as described in claim 1, wherein the radar sensor, the depth sensor, and the optical sensor are configured for gesture detection and recognition under low light conditions.

7. The apparatus as described in claim 1, wherein the processing element is a graphics processing unit (GPU).

8. The apparatus as described in claim 1, wherein the radar sensor, the depth sensor, and the optical sensor are configured for gesture detection and recognition within a range of one meter.

9. The apparatus as described in claim 1, wherein the hand gesture is a dynamic hand gesture and wherein further the processing element is configured to automatically determine a command associated with the dynamic hand gesture.

10. A system for hand gesture detection, the system comprising:
    a processor;
    a first sensor comprising a radar;
    a second sensor comprising a depth sensor; and
    a third sensor comprising an optical sensor, wherein the first sensor, the second sensor, and third sensor are coupled to the processor, and wherein the first sensor, the second sensor, and the third sensor are configured for short range gesture detection and recognition and wherein further the processor is configured to identify a type of hand gesture by combining data acquired with the first sensor, data acquired with the second sensor, and data acquired with the third sensor, wherein the data acquired with the radar is registered to the data acquired with the depth sensor,
    wherein registering the data acquired with the radar to the data acquired with the depth sensor comprises transforming three-dimension (3D) coordinates of the data acquired with the radar to the depth sensor's coordinate frame, wherein said registering further comprises: observing 3D coordinates of a spherical volume concurrently with both the radar and the depth sensor, determining a best-fit transformation function between the 3D coordinates of the spherical volume observed by both the radar and the depth sensor, and using the transformation function to transform the 3D coordinates of the data acquired with the radar to the depth sensor's coordinate frame.

11. The system as described in claim 10, wherein the first sensor, the second sensor, and the third sensor are a portion of a user interface device for use in a vehicle.

12. The system as described in claim 10, wherein a portion of the processor is configured to function as a deep neural network (DNN).

13. The system as described in claim 10, wherein the processor is a graphics processing unit (GPU).

14. A mobile apparatus comprising:
    a processing element;
    a radar sensor;
    a depth sensor; and
    an optical sensor, wherein the radar sensor, the depth sensor, and the optical sensor are coupled to the processing element, and wherein the radar sensor, the depth sensor, and the optical sensor are configured for short range gesture detection and recognition and wherein further the processing element is configured to identify a type of hand gesture of a driver by combining data received from the radar sensor, data received from the depth sensor, and data received from the optical sensor, and wherein the processing element is configured to automatically determine the type of the hand gesture performed and a command associated with the hand gesture, wherein the data acquired with the radar sensor is registered to the data acquired with the depth sensor,
    wherein registering the data acquired with the radar sensor to the data acquired with the depth sensor comprises transforming three-dimension (3D) coordinates of the data acquired with the radar sensor to the depth sensor's coordinate frame, wherein said registering further comprises: observing 3D coordinates of a spherical volume concurrently with both the radar sensor and the depth sensor, determining a best-fit transformation function between the 3D coordinates of the spherical volume observed by both the radar sensor and the depth sensor, and using the transformation function to transform the 3D coordinates of the data acquired with the radar sensor to the depth sensor's coordinate frame.

15. The mobile apparatus as described in claim 14, wherein the processing element is configured to function as a neural network.

16. The mobile apparatus as described in claim 14, wherein the processing element is a graphics processing unit (GPU).

17. The apparatus as described in claim 2, wherein the threshold amount of motion is selected from the group consisting of: a threshold velocity of the motion; and a threshold distance of the motion.

* * * * *